Nov. 11, 1952
M. L. JEFFREY
2,617,706
RECORDER
Filed Jan. 13, 1949
16 Sheets-Sheet 1
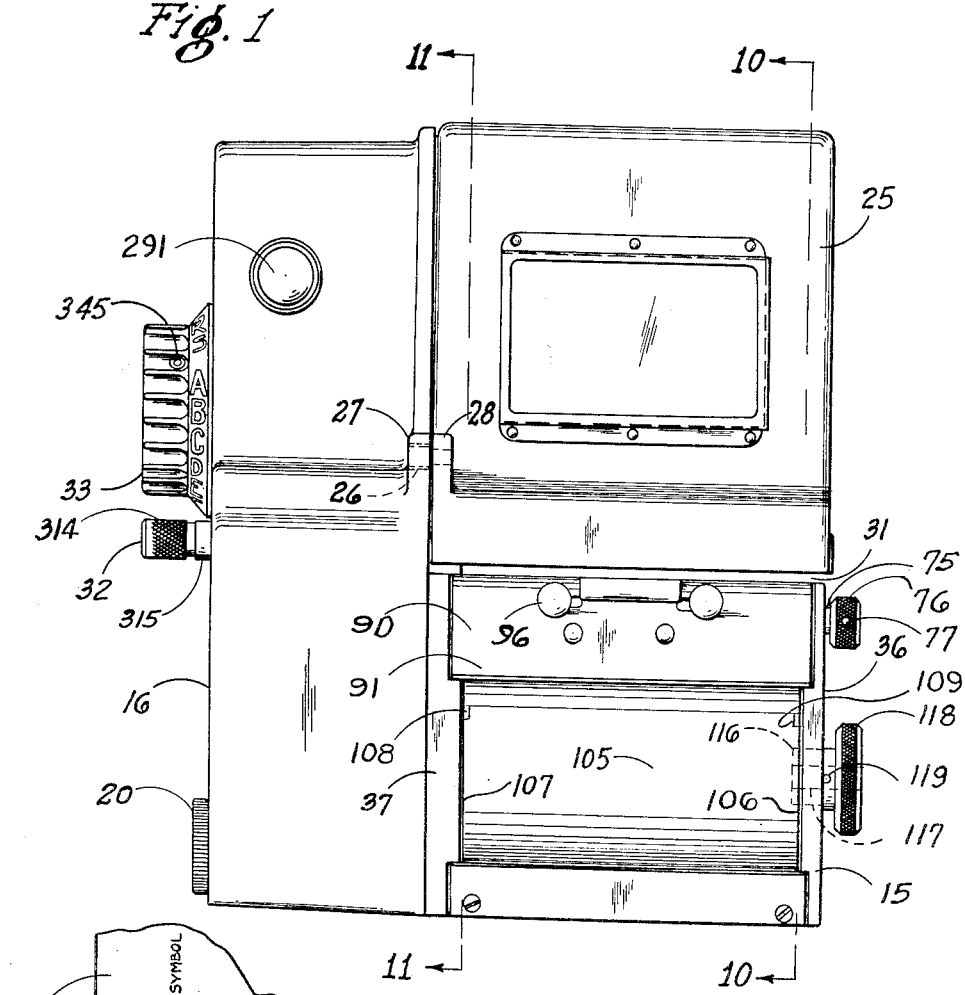
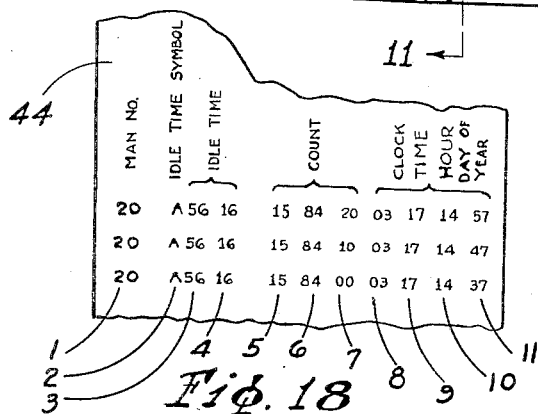
INVENTOR.
MAX L. JEFFREY
BY
J. D. Douglas

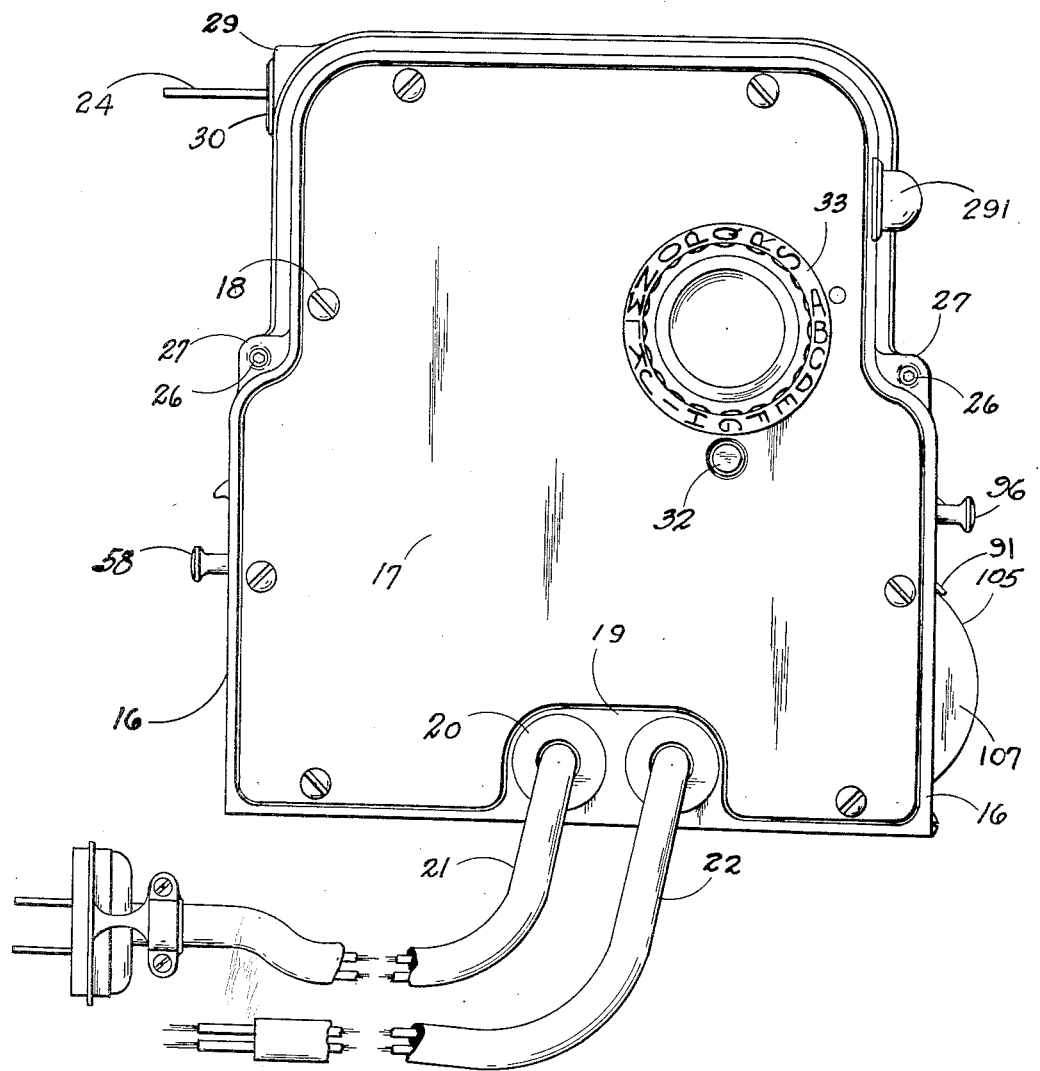

Nov. 11, 1952     M. L. JEFFREY     2,617,706
RECORDER
Filed Jan. 13, 1949     16 Sheets-Sheet 3
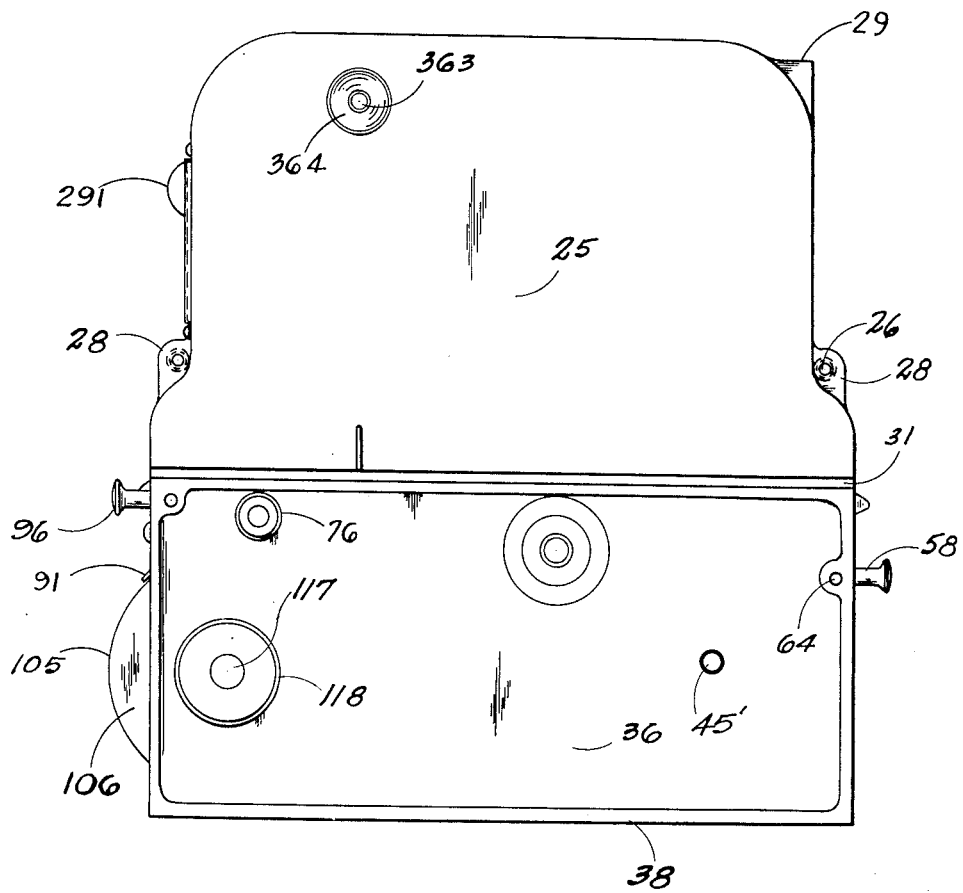
INVENTOR.
MAX L. JEFFREY
BY
J. O. Douglas

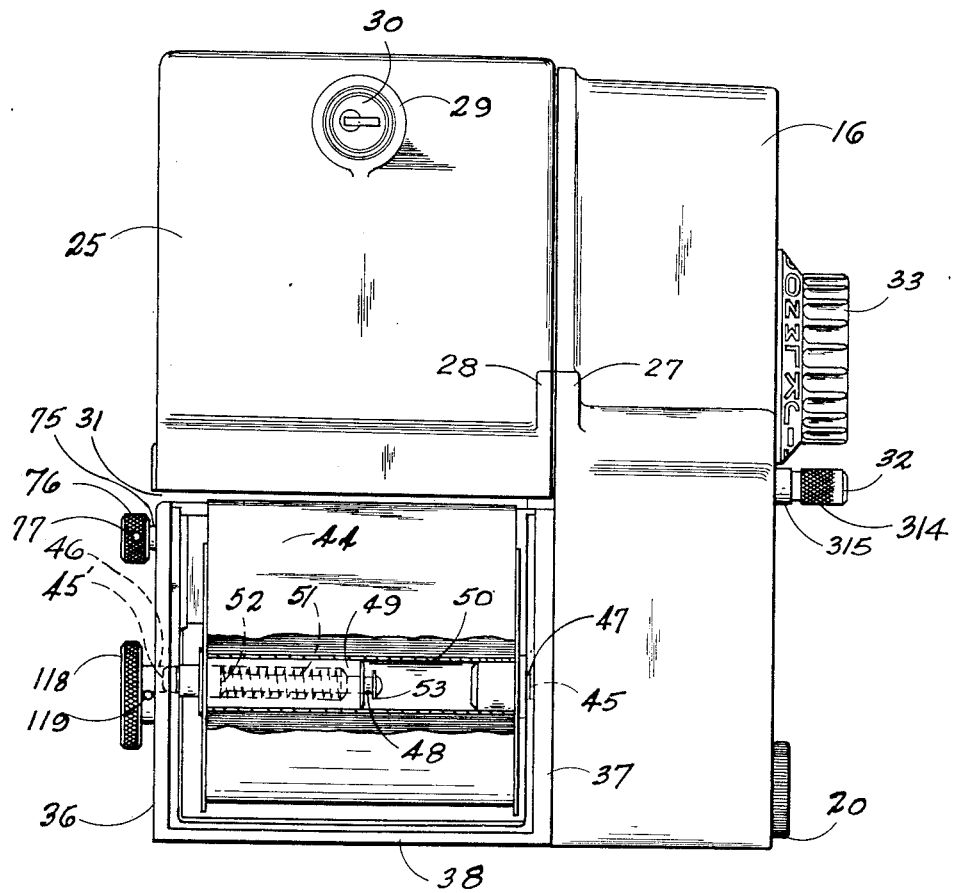

Nov. 11, 1952     M. L. JEFFREY     2,617,706
RECORDER
Filed Jan. 13, 1949     16 Sheets-Sheet 5
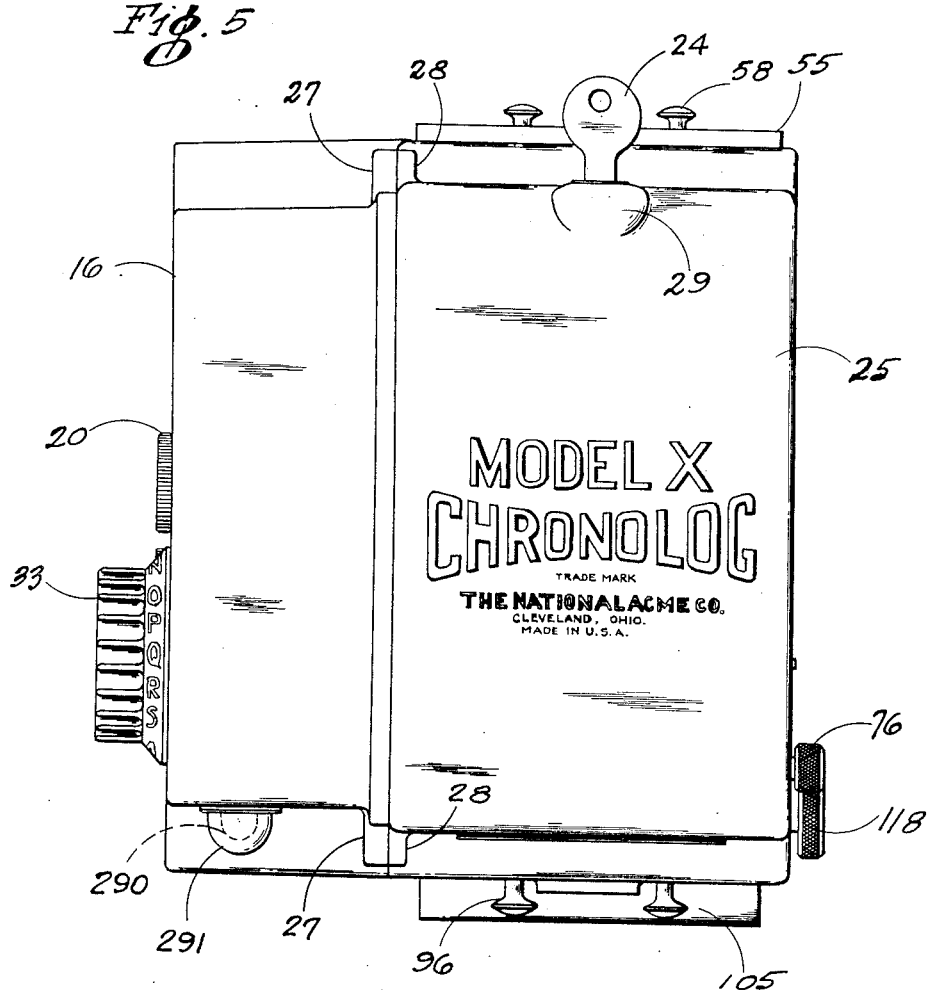
*INVENTOR.*
MAX L. JEFFREY
BY
*J. D. Douglas*

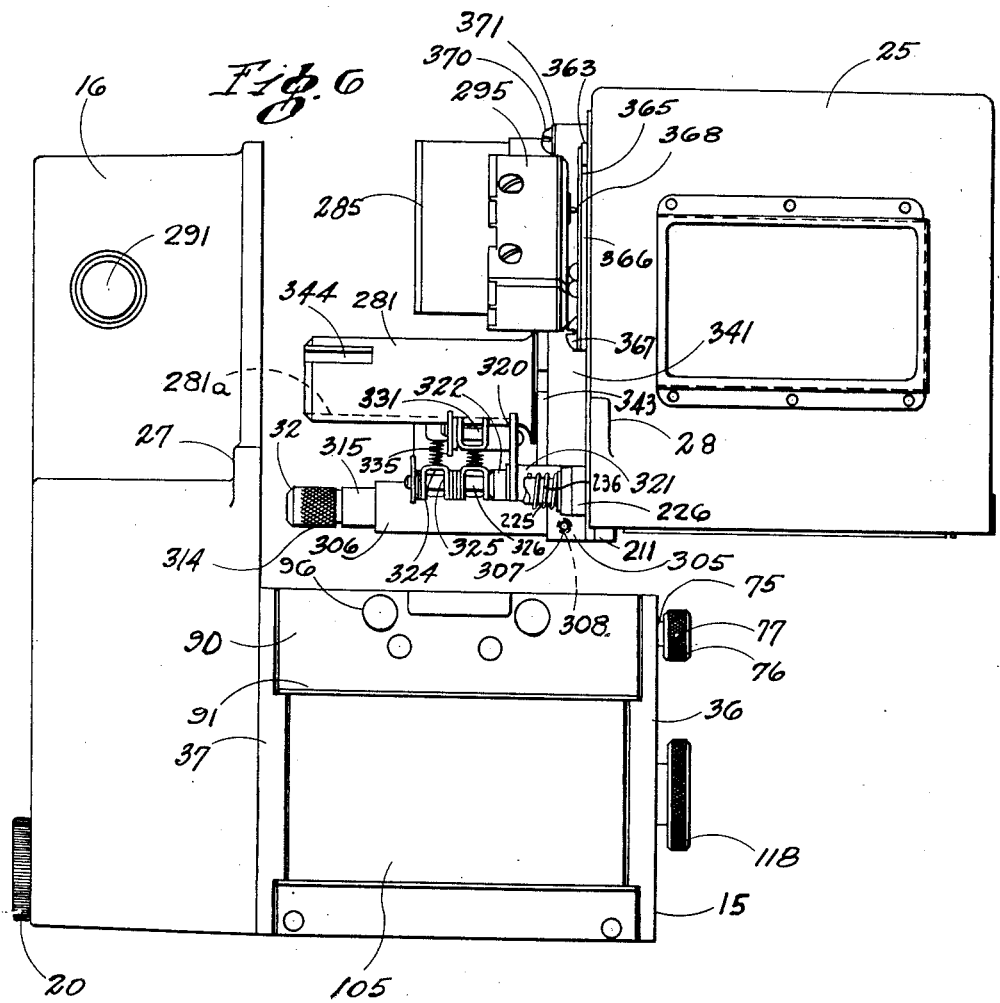

Nov. 11, 1952     M. L. JEFFREY     2,617,706
RECORDER

Filed Jan. 13, 1949     16 Sheets-Sheet 7

INVENTOR.
MAX L. JEFFREY
BY
J. D. Douglas

Nov. 11, 1952　　　M. L. JEFFREY　　　2,617,706
RECORDER
Filed Jan. 13, 1949　　　16 Sheets-Sheet 12

INVENTOR.
MAX L. JEFFREY

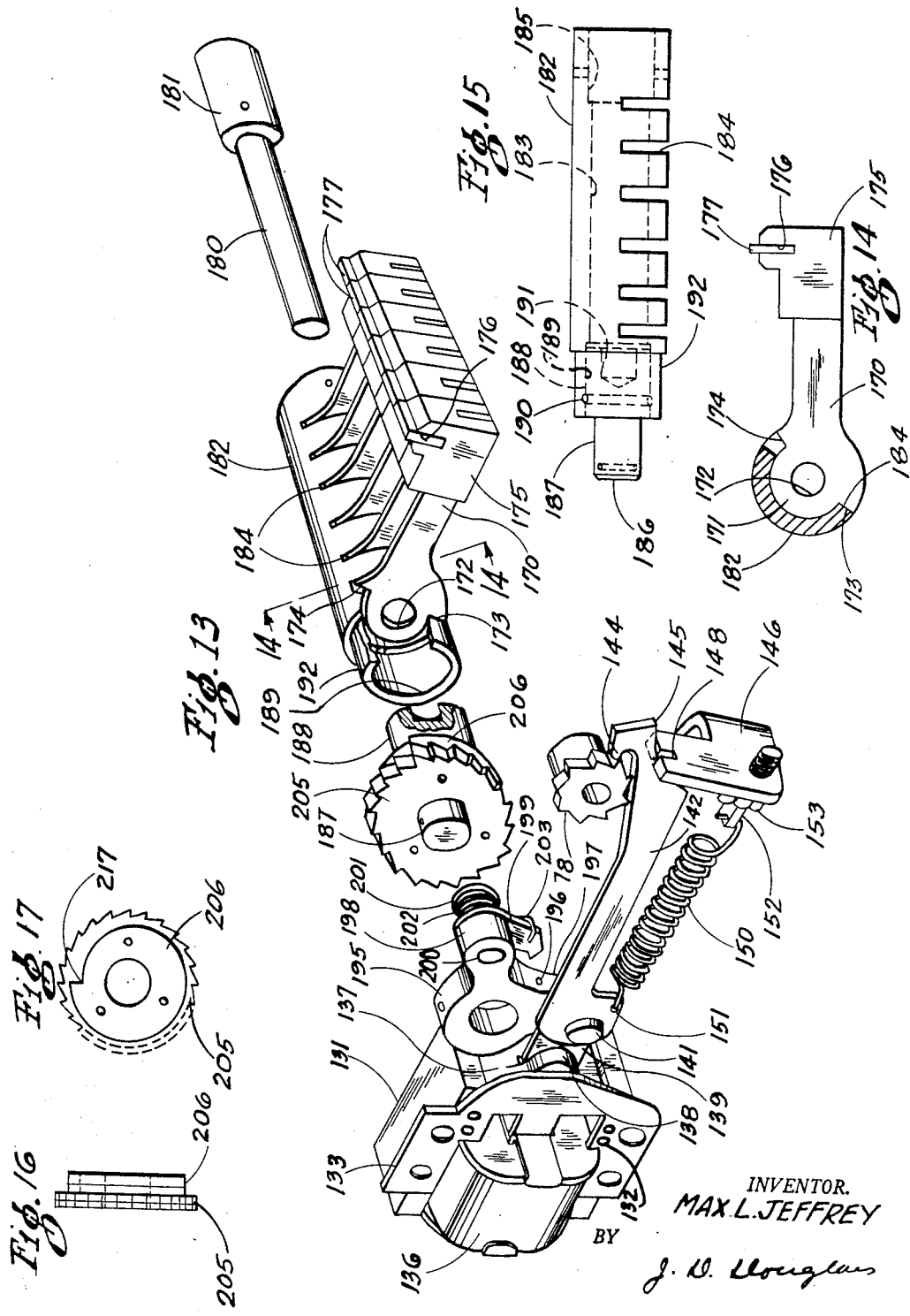

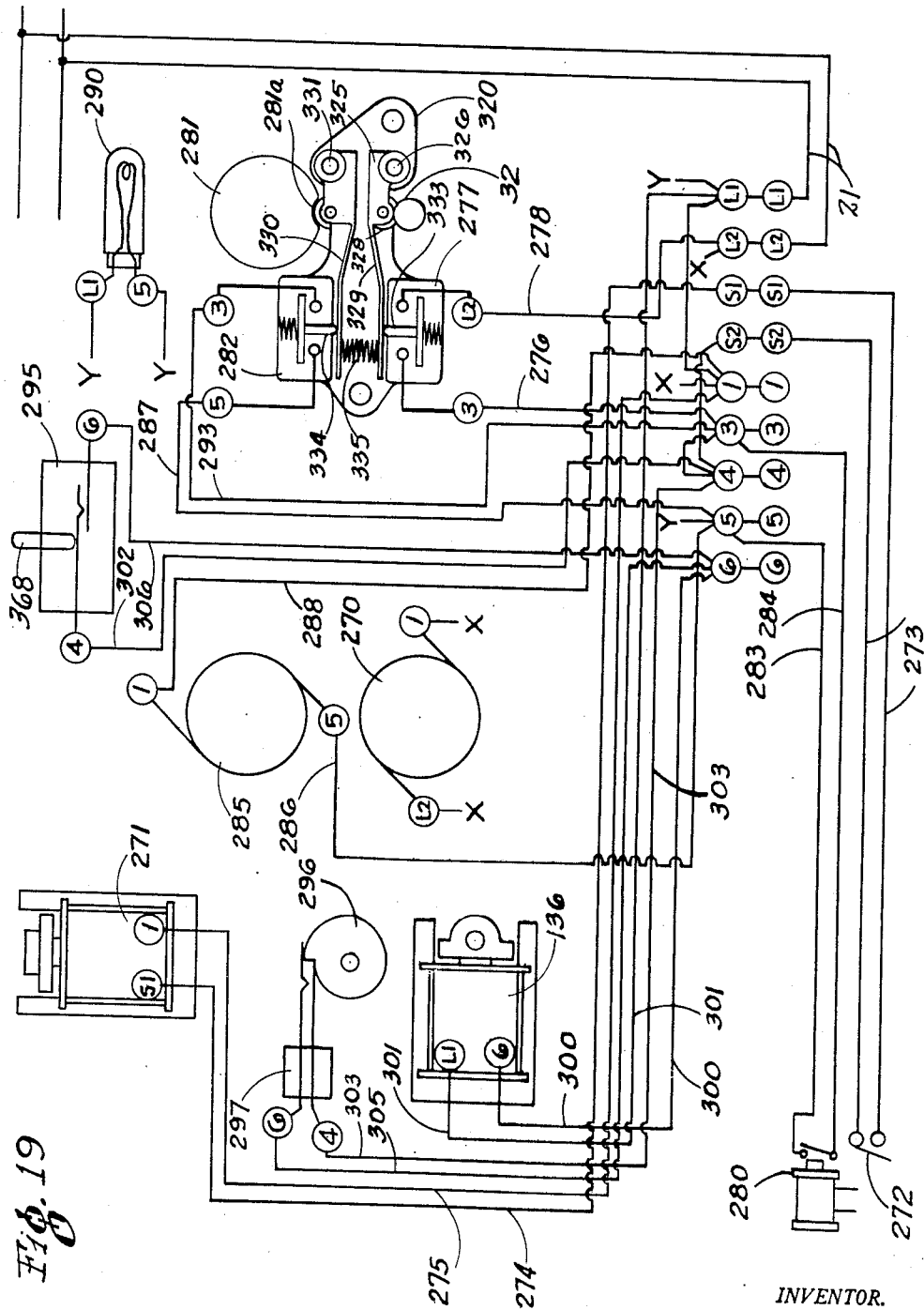

Nov. 11, 1952     M. L. JEFFREY     2,617,706
RECORDER
Filed Jan. 13, 1949     16 Sheets-Sheet 15
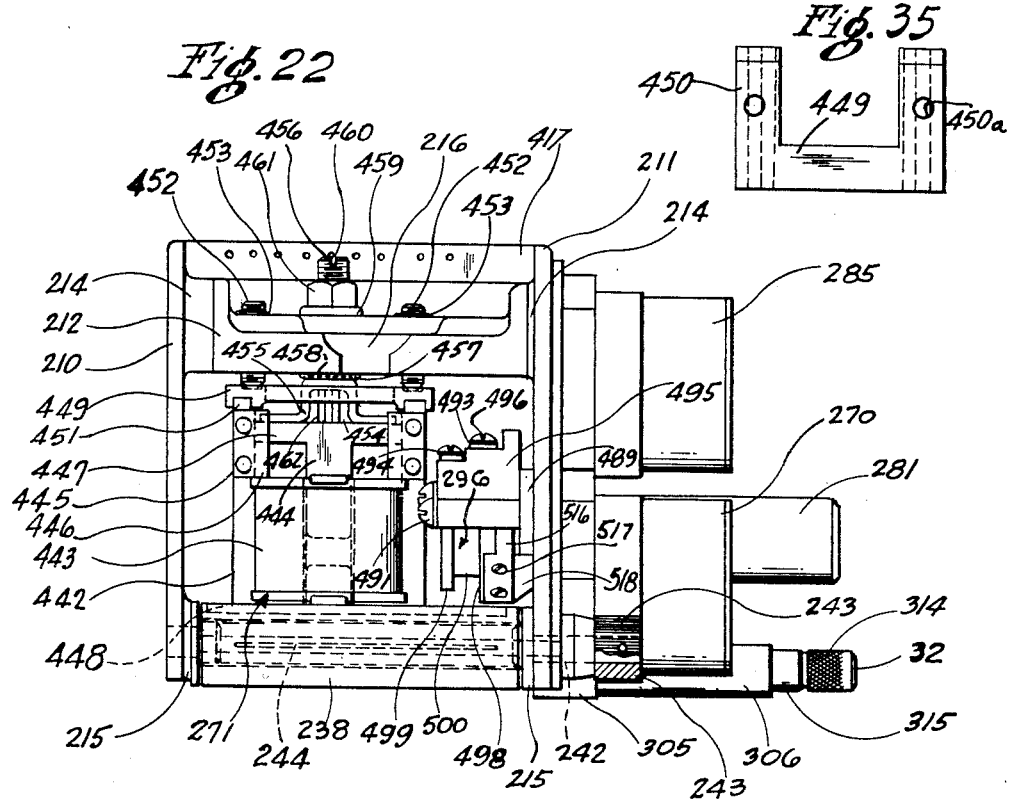
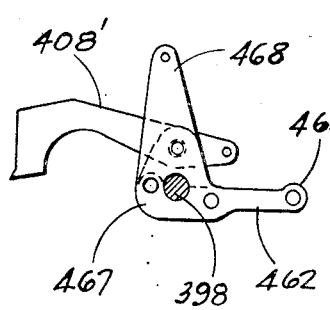
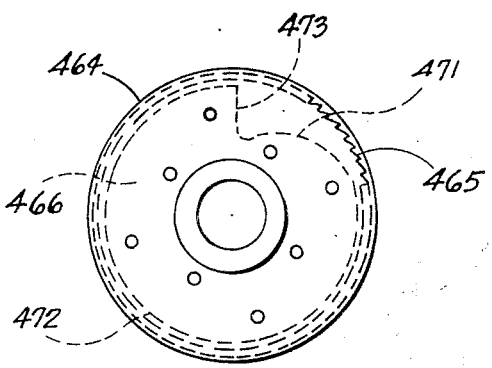
INVENTOR.
MAX L. JEFFREY
BY
J. W. Douglas Nov. 11, 1952     M. L. JEFFREY     2,617,706
RECORDER
Filed Jan. 13, 1949     16 Sheets-Sheet 16
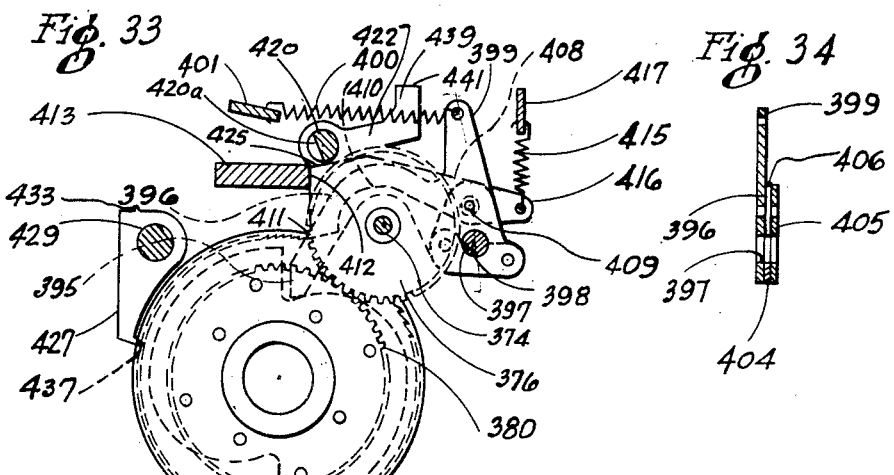
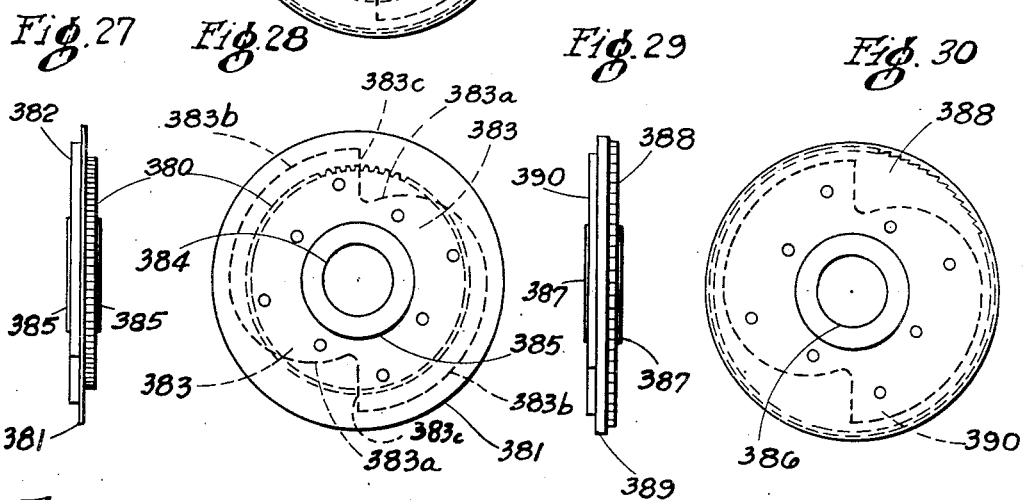
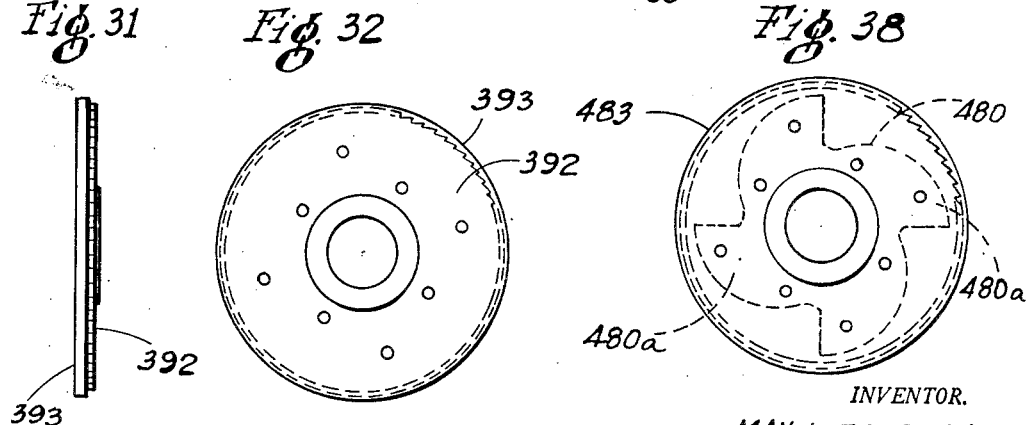
INVENTOR.
MAX L. JEFFREY
BY
J. D. Douglas Patented Nov. 11, 1952

2,617,706

UNITED STATES PATENT OFFICE 2,617,706

RECORDER

Max L. Jeffrey, Shaker Heights, Ohio, assignor to
The National Acme Company, Cleveland, Ohio Application January 13, 1949, Serial No. 70,641

26 Claims. (Cl. 346—81)

This invention relates to recording machines, and more particularly to a recording machine which may be used in conjunction with production machinery in a factory for recording certain data as to the operator, time of operation, production output and other items of interest in combination with the working of the factory machine enabling the cost department to compute costs of operation on the materials being worked as well as determine the efficiency of operation of the machine.

Although machines for accomplishing the foregoing have heretofore been proposed, there have been many disadvantages in such machines which the present invention overcomes. One of the drawbacks of the previous devices was that they were large and bulky as well as complicated in their operation.

By my present invention, I have provided a machine which is small, compact and easy to construct and wherein the operation is greatly simplified.

Among other things, I have provided an improved counter mechanism which operates with greater accuracy and which is so constructed that it may be easily removed from the remainder of the unit for replacement or changing the parts.

The counter mechanism cooperates with a ribbon and a tape together with printing hammers to cause the numbers or indicia on the counter to be permanently recorded on the tape at the conclusion of certain periods of operation or time. In this connection, the ribbon feed is such that the ribbon only passes through the mechanism once during its use, and therefore there is no need for a ribbon reversing mechanism; and because the ribbon not in use is rolled up prior to use, with a minimum amount of ribbon being exposed to the air, there is less tendency for the ribbon to dry out and result in imperfect printing.

The tape can be inserted in position in the machine by persons having a minimum of experience with such devices. During use, the tape is entirely enclosed and is thus not apt to become dirty. The tape, as it is used, is coiled up in a chamber from which it can readily be removed for examination, and does not have to be threaded onto a take-up reel as in the prior devices. The receptacle for receiving the tape is so arranged that it may be used as a platen for making notations thereon when desired.

The printing means is so arranged that it prints uniformly regardless of changes in line voltage or of the time of energization of the printing circuit, thus eliminating faulty printing which sometimes occurred when electrically operated printers were energized at a time when the cycle of alternating current was passed through zero potential.

The printing device also includes a printing hammer mechanism with hammers that, although actuated in unison, print independently thus assuring a more legible printing. The hammer tension may also be adjusted to provide the proper impression on the tape.

The mechanism for holding and feeding the paper tape is such that it automatically brings the tape into proper alignment in spite of the fact that it may have been improperly aligned when placed in the device, and maintains that alignment after it is in the device.

Still other advantages of the invention, and the invention itself, will become apparent from the following description of an embodiment thereof, which description is illustrated by the accompanying drawings and forms a part of the specification.

In the drawings:

Fig. 1 is a front elevational view of a device embodying my invention;

Fig. 2 is a side elevational view thereof;

Fig. 3 is a side elevational view of the other side;

Fig. 4 is a rear elevational view, with certain parts broken away to show the interior parts;

Fig. 5 is a top plan view thereof;

Fig. 6 is an exploded view showing the manner in which the recorder mechanism may be separated from the rest of the device;

Fig. 13 is an exploded view of the printing mechanism disassembled from the remainder of the structure;

Fig. 14 is a side elevational view of one of the hammers;

Fig. 15 is an elevational view of the hammer operating sleeve;

Fig. 16 is an edge view of the ribbon ratchet and cam;

Fig. 17 is a rear elevational view thereof;

Fig. 18 is a view of a section of the tape showing the markings made thereon by the machine of my invention;

Fig. 19 is a wiring diagram for the device of my invention;

Fig. 20 is an inside elevational view of the cover for the paper reel end of the housing;

Fig. 21 is a similar view of a cover for the paper receiver end of the housing;

Fig. 22 is a rear view of the recorder mechanism removed from the remainder of the assembly;

Fig. 23 is a view of the ribbon ratchet feed removed from the remainder of the mechanism;

Fig. 24 is an elevational view of the operator's key;

Fig. 25 is a view of the operator's key barrel removed from the other mechanism;

Fig. 27 is an edge elevational view of a gear and cam assembly for recording clock time;

Fig. 28 is a side elevational view thereof from the gear side, the shape and position of the cam on the opposite side being shown by dotted lines;

Fig. 29 is a view similar to Fig. 27 of the minute register wheel;

Figure 7:
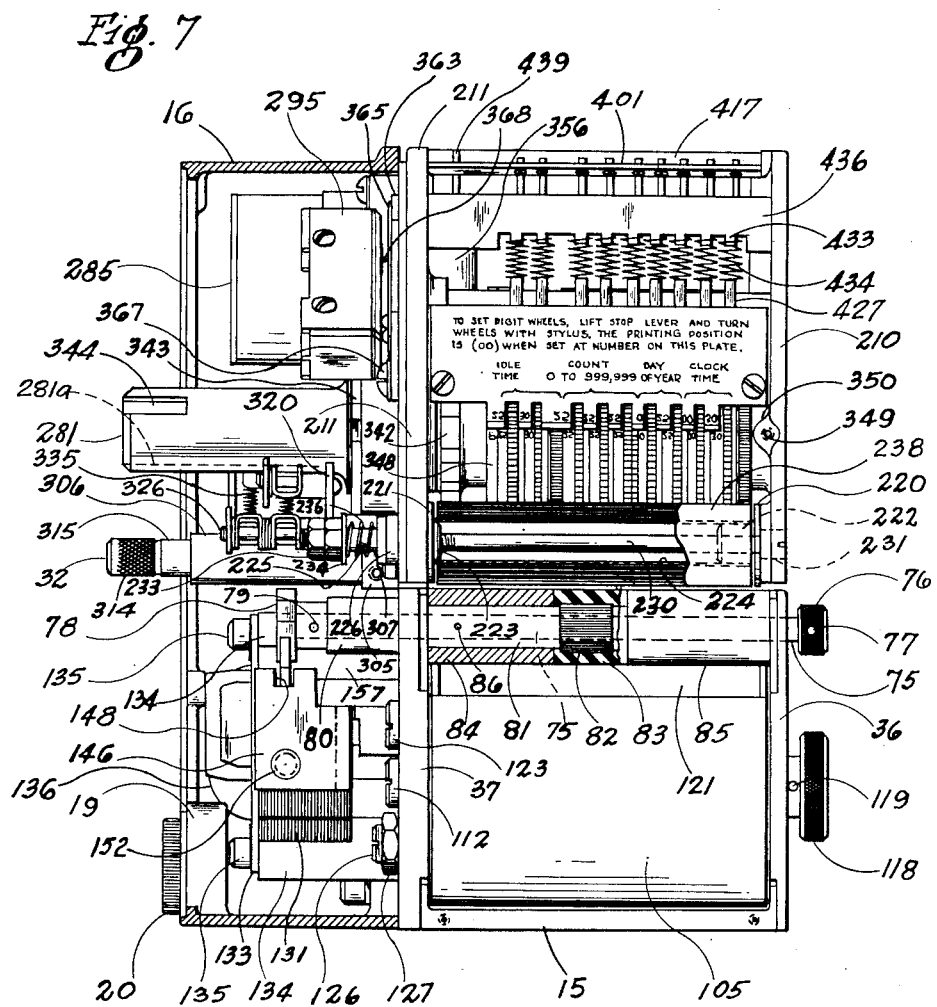
Fig. 7 is a view from the front of the device with one of the covers removed and the other shown in section illustrating the appearance of the interior mechanism, in this view certain of the parts are shown in section.

Fig. 30, like Fig. 28, is a side elevational view thereof;

Fig. 31 is an edge view of the hour wheel;

Fig. 32 is a side view thereof;

Fig. 33 is a side view of the register wheel for registering idle time together with the cam and rotated levers showing the manner in which they cooperate therewith;

Fig. 34 is a sectional view of the follower lever removed from its association with the other parts, but taken along the line 34—34 of Fig. 33;

Fig. 35 is a plan view of the counting solenoid clamping member;

Fig. 36 is a side elevational view of the counting lever and counting symbol wheel ratchet removed from the assembly;

Fig. 37 is a side elevational view of the first counting wheel; and

Fig. 38 is a side elevational view of a counting wheel used in the clock time recorder.

The function of the apparatus of my invention can best be understood by reference to Fig. 18 which is a view of a portion of a tape as printed by the machine. As previously stated, the purpose of the machine is mainly, although not necessarily restricted thereto, for use in conjunction with machines in a shop to enable the foreman or supervisor to determine the chronological history of the machine's operation. As shown in Fig. 18, the first column 1 shows the number of the man operating the machine. This number is determined by a key 32 in the possession of the operator, which key is inserted in the device when the operator comes on the particular job. If he is on the job but has not yet started actual production, he may set the symbol knob 33 to provide a registration for the reason for idle time; in this instance, the symbol A in column 2. There is then shown in columns 3 and 4 the total hours and minutes of idle time, this being determined by a clock which may start when the operator's key is inserted or be connected to start when production ceases. Columns 5, 6 and 7 show the number of pieces made by the machine, which at the start would be zero.

The last four columns 8, 9, 10 and 11 show the day, year, hour (24 hour day) and minutes. These numbers are operated by a clock independent of the other numbers or columns and normally would run continuously. When the operator puts his key in the machine, a printing action may be effected which will show on the tape the man's clock number, the time he started, and then subsequently the other information as indicated.

The ultimate objective then of the mechanism to be described is to afford the recording of this information.

As shown in Figs. 1 to 3 inclusive, the invention is so coordinated that, although the device is a unitary whole, it is made up of a number of discrete sub-assemblies, which not only increase the ease of assembly but result in certain economies of manufacture as well as resulting in greater accessibility to the various parts.

A base housing 15 is provided which houses the paper tape carrying mechanism and the means for advancing the tape. This housing has secured thereto by screws 14 at one side a second housing section 16 which provides a cover for the tape operating mechanism which extends beyond the side of the base housing. This housing is provided with a removable cover plate 17 held in place by screws 18. A boss 19 is provided at the bottom of the housing 16 having grommets 20 through which a line cord 21 and a circuit cord 22 extend from the exterior of the housing to the interior of the housing.

The upper end of the housing supports, in over hanging relation to the housing 15, by screws 14a, the recorder mechanism, which is supported on a separable frame and is covered by the removable cover 25. The cover 25 is held in position by set screws 26 disposed in ears 27 on the housing 16 and which may extend into openings in similar ears 28 on the cover. The cover is also held by a suitable latch or lock 30 disposed in a boss 29 on the cover and controlled by a key 24. The cover can only be removed by one having a key to fit the lock.

It will be noted that the recorder mechanism is supported in spaced relation above the printing mechanism, there actually being a gap 31 best shown in Fig. 1, between the two parts. Thus the mechanism is adapted to have a time card or other sheet inserted in the gap if desired and to allow the same to be printed in the same manner as the tape.

This is also a convenient manner in which the setting of the counter wheels can be determined since the operator need only insert a sheet of blank paper and cause the machine to print, the printed matter will then appear on the blank paper.

As can best be seen in Figs. 1 and 2, the operator key 32 is inserted through an opening in the cover plate 17. The symbol knob 33 is disposed exteriorly of the cover plate, being provided with lettered indicia from A to S inclusive, whereby the same may be turned to indicate the various reasons for idle time, or for regular operation.

Base housing and tape feed mechanism

As previously stated, there is provided a base housing 15 to which a side housing is secured and which in turn supports the recorder housing. The base housing comprises a generally rectangular box including spaced apart parallel side walls 36 and 37 connected by a bottom wall 38. The ends of the housing are open to provide access to the interior and a vertically extending partition 39 extending transversely across the base divides the interior into two compartments 40 and 41. The partition does not extend entirely to the top of the housing, the upper edge being spaced from the top, as indicated at 42. Adjacent the wall 36 the partition is provided with a threaded boss 43 which opens through the bottom for receiving a mounting screw, not shown.

Figure 10:
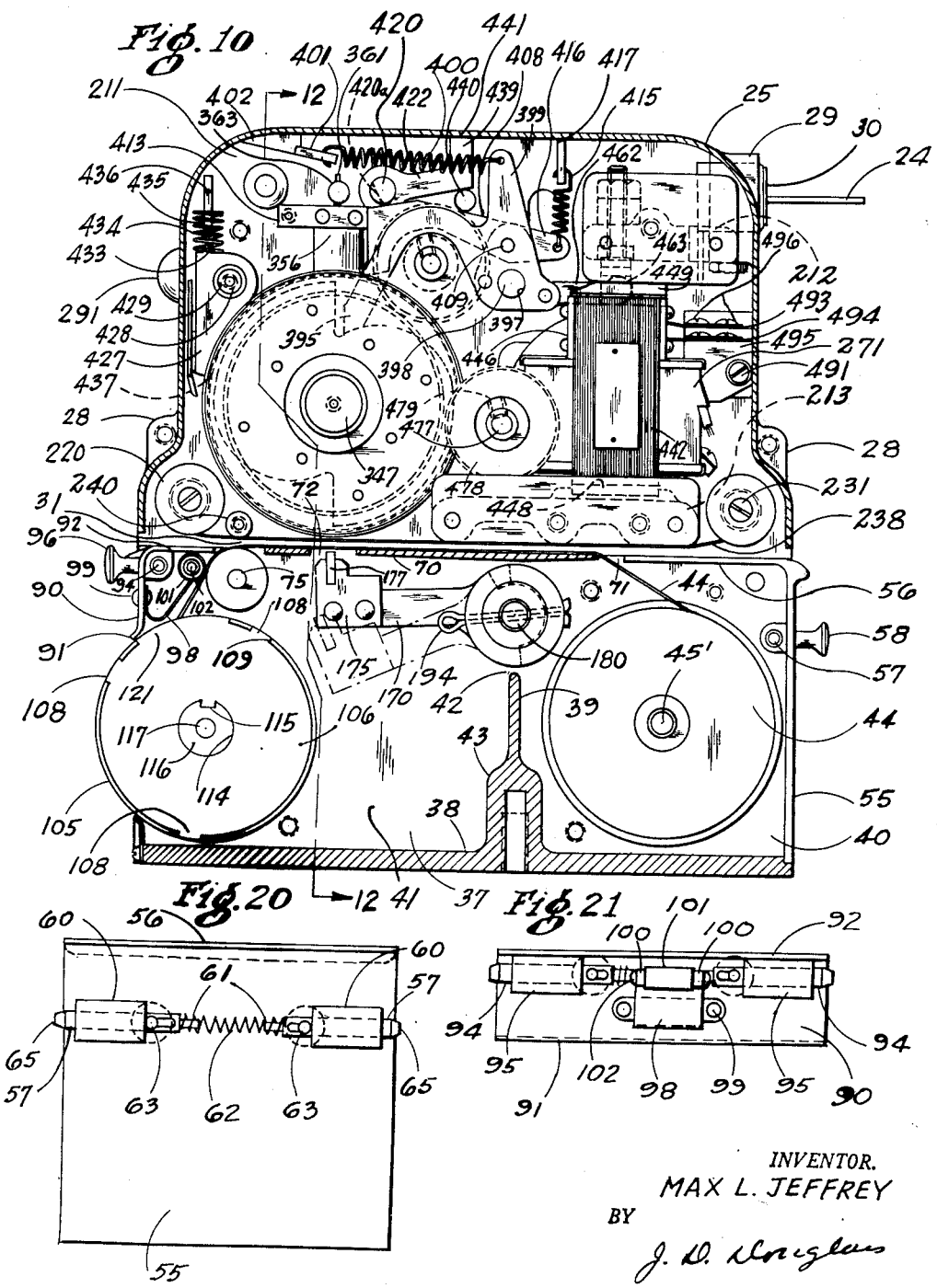
Fig. 10 is a view taken on line 10—10 of Fig. 1, with the housing and cover being shown in section and the remaining parts in elevation.

The chamber 40, as best shown in Fig. 10, houses a reel of paper 44, the ends 45 and 45' of the reel axle being journalled in opening 46 in the side walls. Preferably, the side walls are formed with grooves 47, Fig. 11, which serve to guide the reel when it is inserted in position. The end 45', Fig. 4, comprises a spring pressed plunger which, as can be seen in Fig. 3, is visible from the outside of the housing. The plunger is provided with a shank 48 which extends through a plug 49 disposed in a hollow core 50 of the reel. A spring 51 disposed in a bore has one end engaging the end of the bore, and the other end engages a shoulder 52 on the plunger and urges the plunger outward, the outward movement being limited by a key 53 on the end thereof.

The reel may therefore be disengaged from its support with the housing by pushing it to the left, as viewed in Fig. 4, which enables the end 45 to be removed from its bearing. The end is then pulled rearward slightly and the other end pushed inward by the finger which can engage the end 45', or a tool may be used to disengage that end, by pushing it inward, out of its bearing; it may then be slid outward in the grooves 47.

When the reel is inserted, the ends 45 and 45' are placed in the grooves 47 by telescoping the end 45' inward, and the reel is then pushed into position, the ends snapping into the openings in the walls.

Figure 11:
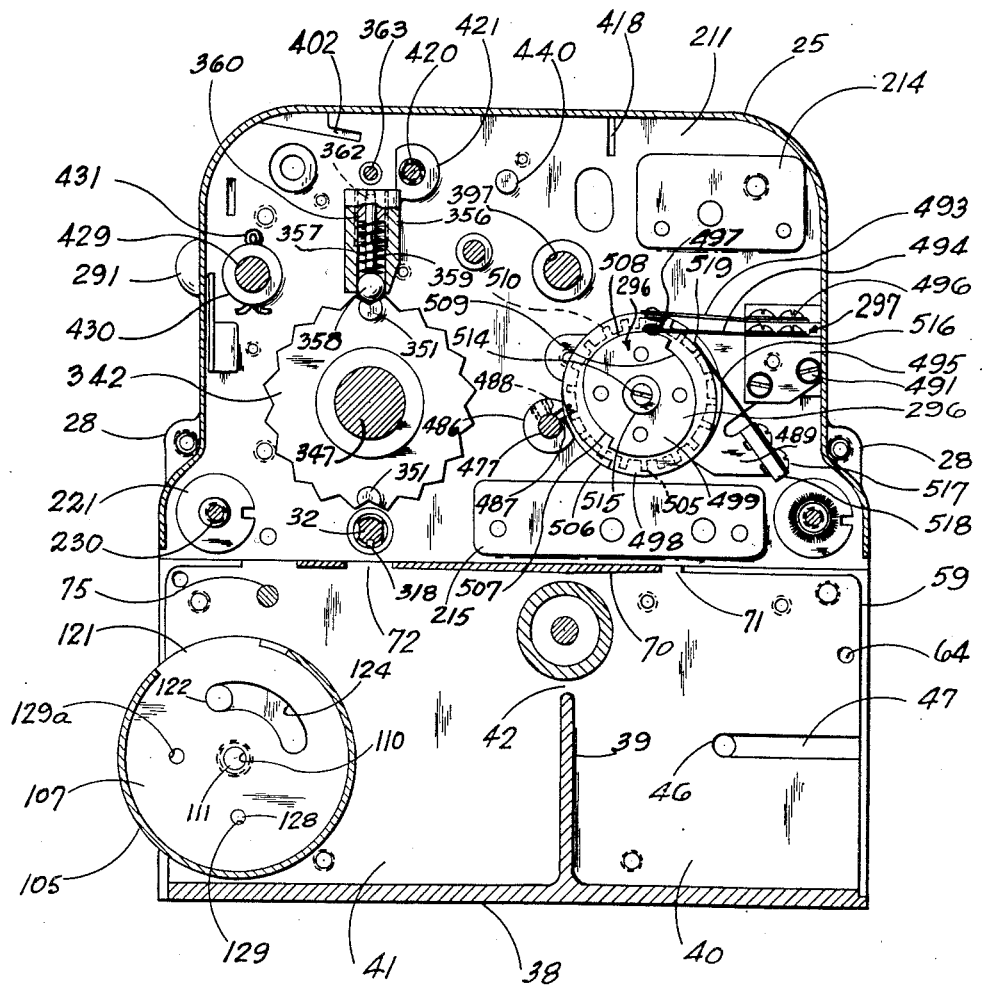
Fig 11 is a similar view taken on the line 11—11 of Fig. 1.

The open end of the housing, and the chamber 40, which houses the paper roll, is closed by a removable cover, Fig. 20, having a perpendicular wall 55 and a top wall 56; the cover fitting flush with the walls by seating on a seat 59, Fig. 11, as best shown in Fig. 10. The cover is removably held in place by latches 57 having operating knobs 58 extending rearwardly of the cover. The latches comprise rods which are slidably journalled in bosses 60 on the inside of the cover. The ends of the rods are reduced at 61 and a spring 62, seated on the reduced ends between the rods, forces the two rods outward. The knobs 58 have shanks 63 which extend through the rods and limit their outward movement by engagement with the bosses. The side walls of the housing are provided with recesses or holes 64 into which the tapered ends 65 of the rods seat. The cover is thus held securely in position on the seat. The top of the housing is provided with a wall 70, extending across the housing, the wall being in spaced relation from the top 56 of the cover to provide a gap 71 through which the paper may be trained. The wall extends toward the front of the housing, covering all but the ends of the printing hammers and is provided with a slot or gap 72 near the front end, through which the heads of the hammers operate.

The front end of the housing carries the paper feed roll and the printed paper receptacle. The paper feed roll, Figs. 7 and 10, comprises a shaft 75 which is rotatably journalled in the side walls 36 and 37. It extends beyond the wall 36 and is provided with a knurled knob 76, which is pinned on the shaft by a pin 77. The other end of the shaft extends through an outwardly extending boss 80 integral with the side wall 37. The extremity of the shaft is provided with a ratchet gear 78 pinned on the shaft by a pin 79. Between the two walls the feed roll carries a core sleeve 81 adjacent the wall 37, the end part of which is at the center of the roll and is enlarged and knurled at 82. The knurled portion carries a rubber sleeve 83 which is flanked on one side by a metal sleeve 84 disposed on the sleeve 81 and the other side by a sleeve 85. The sleeve 85 is a press fit with the shaft and the sleeves 81 and 84 are held on by a pin 86. The outside diameters of the sleeves 84, 85 and rubber 83 are all substantially the same. It will thus be seen that the rubber portion may be replaced if it becomes damaged through wear or age.

The paper is trained over the wall 70, across the gap 72 and the remainder of the wall and over the feed roller. It is held in contact with the rubber of the feed roller by a pressure member carried by a small cover for the upper corner of the forward end of the housing (Fig. 21). The cover is similar to that for the other end of the housing but smaller. It includes a vertically extending front part 90, the bottom of which is provided with an outwardly curved lip 91, and a top horizontally extending wall 92. The cover is held in place in exactly the same manner as previously described, the latches 94 which are disposed in bosses 95 on the interior of the cover being operated by knobs 96.

The pressure member which is carried by the cover includes a spring bracket 98 riveted to the cover at 99. It is provided with a bifurcating end 100 between the ends of which the roller 101 is journalled by a pin 102.

In operation the paper is merely drawn over the feed roller with the cover removed and the cover when replaced causes the roller 101 to engage the paper between the roller 101 and the rubber portion 83. This makes the threading of the paper through the device an extremely simple operation. The construction is such that the paper, even if inserted askew tends to straighten out as it is fed by the roller, this being due to the fact that the paper is pulled from the reel over the partition and printing opening by exerting frictional force to the center of the paper in a very limited area.

The paper after leaving the feed roller runs downward into a paper receiving receptacle, where it coils itself up and can be stored until such a time as it is desirable to tear it off. It may also be brought out exteriorly past the lip 91 of the cover if desired, the lip also being used at a point where the paper may be torn off The paper receptacle comprises a hollow cylindrical drum, which may be fabricated of sheet metal and comprises a cylinddical exterior wall 105, which may be chrome or nickle plated, and is held in position by circular end walls 106 and 107. Figs. 1, 10 and 11. The end walls are provided with tongues 108 which engage in notches 109 in the end of the cylinder wall, the assembly being brazed or silver soldered to hold the parts in position prior to plating.

Figure 9:
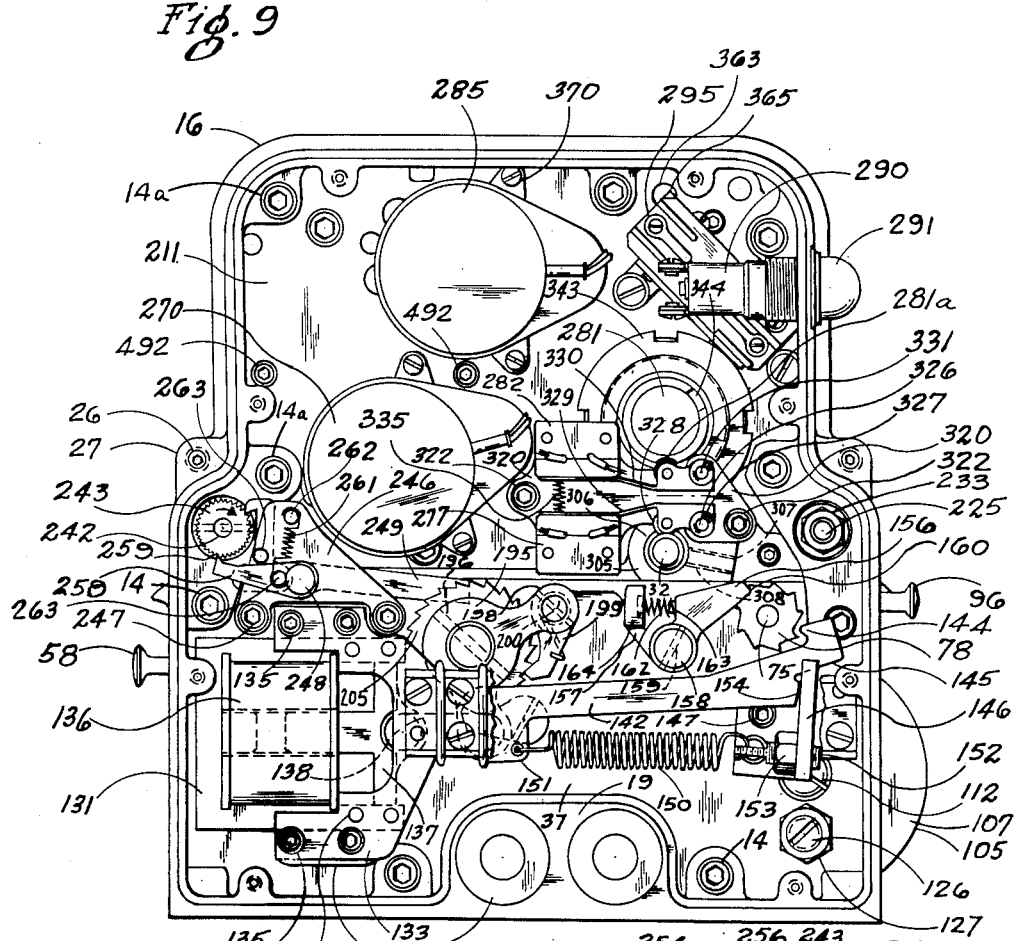
Fig. 9 is a similar view of the side shown in Fig. 2 with the cover plate and the setting knob removed.

The receptacle is rotatably supported, within certain limits, between the side walls 36 and 37 of the housing. The end wall 107 is provided with an axial opening 110 into which the bearing end 111 of a screw 112, which is threaded through the walls 37 of the housing, extends (Figs. 7, 9, and 11). The other end wall, 106, is provided with a circular opening 114 having an inwardly extending tongue 115 which is disposed in interlocking engagement with a supporting coupling. The supporting coupling includes the complementary member 116, which is disposed on the inside of the housing and provides an easy fit with the opening 114, and a shaft 117 which extends rotatably through the wall 36 of the housing and is held in place by an exteriorly disposed knurled knob 118 that is pinned to the shaft 117 by a pin 119. The knob allows the receptacle to be turned within limits and the receptacle may be removed by taking out the screw 112 and the coupling 116.

The receptacle cylindrical wall is formed with a longitudinally extending opening 121, of sufficient width circumferentially of the receptacle to allow ample room for the paper to travel into the receptacle. The rotary movement of the receptacle, which may be rotated by the knob 118, is limited by the end 122 of a screw 123 threaded in the wall 37 and which end extends into an arcuate slot 124 in the end wall 107 of the receptacle. The receptacle is held frictionally against easy turning by an adjustable ball detent or bullet catch which includes the adjusting screw 126 and lock nut 127 that forces the catch 128 into openings 129 or 129a in the end wall 107. It will be noted that in one position the opening 121 is disposed beneath the cover and inward of the lip 91. In this position the smooth exterior surface of the receptacle extends slightly beyond the front of the device as can best be seen in Fig. 10. This surface also provides a convenient platen for the paper, when it extends out of the receptacle beyond the lip 91 of the cover, permitting certain pencil notations to be made thereon should the operator so desire. The receptacle, when rotated within the limits of the slot 124, presents the opening well below the lip 91 enabling the paper to be removed or the end to be easily inserted if it is at the start of an operating period.

The paper feed roller is rotated, through the ratchet gear 78 by a ratchet which is operated by a solenoid. The same solenoid is arranged so that on its energized stroke the paper is first moved, and on the release stroke the printing occurs.

The solenoid includes the usual "E" laminations to provide a stator 131, Fig. 9, to which, at 132, is riveted a bracket 133, by means of which the stator is mounted on posts 134 extending outward from the wall 37, by hollow head screws 135. The usual winding 136 for the solenoid is provided, the connection being omitted in the drawing for the sake of clarity. It is provided with an armature 137 of T shape, which is reciprocable between the pole pieces and into the solenoid in the usual manner. The head of the armature is provided with a pair of ears 138, between which is pivotally secured a short link 139. The other end of the link is secured by a pivot pin 141 to a ratchet bar 142. The end of the ratchet bar extends under and beyond the ratchet gear 78 and is provided with a gear engaging tooth 144. The under surface of the bar opposite the tooth 144 slants as indicated at 145. This end is guided by an angle bracket 146 which is secured on the end of a post extending outward from the housing wall 37, by screws 147. The bracket is provided with a guide notch 148 into which the bar extends. A spring 150, having one end anchored in an ear 151 on the ratchet bar, is adjustably secured to the bracket 146 by an eye bolt 152, a lock nut 153 being provided for locking the same in position. The spring pulls the ratchet bar, and the armature solenoid, toward the bracket, the movement of the bar being limited by a boss 154 which engages the bracket.

A ratchet assist pawl 156 is disposed above the bar, Fig. 9, being pivotally supported on a post 157 by a headed pin 158, which has a shank extending into the post and secured in place by a lock pin 159. The bar has a ratchet engaging point 160 and is held in contact with the ratchet, by a spring 162 interposed between a shoulder 163 on the pawl and an abutment 164 carried by the post 157. The spring has one end seated in a recess in the abutment 164 and the other end seated around a projection on the shoulder 163.

The operation should be obvious. When the solenoid is energized, the armature is attracted into the solenoid pulling with it the link 139 and the ratchet bar 142 against the pressure of the spring 150. The tooth 144 engages the ratchet gear 78 turning the gear and the shaft 75 of the feed roll, the assist pawl 156 operating in the usual manner.

The ratchet is held in its pawl engaging position due to the upward pressure afforded by the spring 150 which is connected to the ear 151 below a horizontal line passing through the ratchet bar pivot 141. Downward movement of the end of the ratchet bar is limited by the slanting bottom edge 145 which may bottom in the slot 148 of the bracket at the end of the stroke. The slanting bottom edge also assures that the bar will move upward on the return stroke when the solenoid is de-energized.

*The printing hammer action*

Printing of the paper is effected by forcing the paper upward with a rubber nosed hammer against the printing ribbon which is backed up by the recorder having the printing wheels with the various indicia thereon. As previously stated, the paper is first moved by the solenoid. The printing is then effected upon release of the solenoid. The ribbon feed is also controlled by the same solenoid indirectly. The manner of operation is arranged so that the printing stroke occurs upon the deenergization of the solenoid, rather than upon energization, in order that the printing stroke or actual impression would be the same regardless of variations in line voltage or the time during the cycle (the solenoid is preferably A. C. operated) when the solenoid circuit is energized. This is effected by what may be termed a cocking action of the hammers, after which they are released and when released, they fly up and hit the paper. Furthermore, in order to insure a more uniform printing, the hammers, although they operate in unison, to print an entire line across the sheet, as in Fig. 18, are really a plurality of discrete hammers operated by a single instrumentality.

As best shown in Fig. 10, the hammers are pivotally supported between the walls 36 and 37 of the base housing above the partition 39 and extend into the chamber 41 operating below and through the gap 72 in the wall 70. This is effected by freely mounting the hammers on a pin or axle under control of a limiting guide so that they are lowered during the cocking stroke and then upon release they are moved quickly upward. The part which moves them upward partakes of a limited movement, and the inertia of the hammers causes them to continue in their upward swinging movement to effect the printing.

As best shown in Fig. 14, each hammer includes a shank 170, the base of which is enlarged to provide an eye 171, having a bearing bore 172. A pair of shoulders 173 and 174 are provided, which, as will later appear, constitute the operating and limit portions of the hammer. The extremity is provided with a head 175, which may be of die cast metal, and is provided with a transverse slot 176 in which is disposed a rubber striking element 177. The rubber element is held in the slot by staking the metal adjacent the edge of the slot to force the metal inwardly into the rubber. As can be seen, the rubber extends beyond the edge of the hammer.

The hammer support includes a shaft 180, of a diameter to provide a free fit in the openings 172 in the eyes, and having a head 181 on one end. A sleeve 182 is provided, having a bore 183, into which, circumferentially extending slots 184 extend. In this instance, six slots are provided since the design contemplates the use of six hammers. It will be appreciated that there are no limitations on the number of hammers that may be used.

The shaft is supported in the sleeve, the head 181 being disposed in a counterbore 185, where it is held by a cross pin 194, and the other end being seated in the bore 191 of a bearing support 186. The bearing support 186 comprises two stepped portions 187 and 188, the portion 188 being disposed in a counterbore 189 in the other end of sleeve and held in place by a lock pin 190. The hammers are journalled on the shaft 180 and extend out through the slots 184. The eye 171 provides a close sliding fit within the bore of the sleeve. As can best be seen in Fig. 14, the slots 184 in the sleeve 182 extend for 180 degrees, but the stops 173 and 174 are not diametrically opposite each other but subtend an angle of greater than 180 degrees. Therefore, the hammers may move on the shaft 180 a distance depending on the size of the gap provided between the shoulder 174 and the edge of the slot when the shoulder 173 is in engagement with the other end of the slot. The shoulder 173 is normally held in engagement by the weight of the hammer. The end of the sleeve 182, where the shaft head 181 is disposed, is rotatably journalled in the wall 36. The other end of the sleeve is provided with a portion 192, of reduced diameter, which is journalled in a boss 193 integral with the side wall 37 and extending outwardly therefrom.

The stepped portion 187 of the member 186 provides a shaft which extends outward from the boss 193 and has secured on its end a bell crank lever 195 secured to the shaft by a pin 196 and having an arm 197 connected by the pin 141 to the link 139, this being the same pin that connects the link to the ratchet bar. A second arm 198 is provided on the bell crank member 195 and carries a ratchet pawl 199 that is journalled on a pin 200 carried in the arm. The pin 200 is pinned in the arm and extends outward therefrom toward the housing wall and has a head 201 on its end. A spring 202 is disposed around the shank of the pin, with one end secured in an opening in the head 201 and the other end provided with a U-shaped part 203 which engages the pawl 199.

Rotatably journalled on the shaft 187, between the bell crank lever and the end of the hammer sleeve, is a ribbon feed ratchet and cam, Fig. 16. This preferably comprises a ratchet portion 205 and a cam part 206.

The assembly may be stamped from four parts, two of which form the ratchet and two the cam, which parts are riveted together. The ratchet cam assembly is provided with a central opening whereby it may be rotatably journalled on the shaft 187. As previously stated, the bell crank 195 has a pawl 199 which engages with the ratchet teeth. A second pawl 207 journalled on a headed pin 208 is held by a spring 209 against the ratchet. As will be appreciated, the solenoid causes the bell crank to operate which causes the cam 206 to be ratched around and to operate the ribbon feed as will later more clearly appear.

When the solenoid is operated, the bell crank 195 is rotated clockwise as viewed in Fig. 13. This rotates the shaft 187 on the bearing 186 and with it the hammer shaft and sleeve. This causes the hammers to be lowered, as seen by the dot dash lines in Fig. 10, against the pressure of the spring 150, which, as previously stated, may have its tension adjusted by the screw 152. This causes the ratchet bar to move the paper, when the solenoid is de-energized, the spring pulls the ratchet bar, the bell crank lever, the link 131 and the armature all to the right as viewed in Fig. 13. This is a quick violent operation and results in the hammer sleeve being rotated suddenly counterclockwise. The hammers are moved suddenly upward by the end of the slots 184 in the sleeve engaging the shoulders 173 on the hammer. The movement of the mechanism is stopped by the shoulder 154 on the ratchet bar engaging the bracket 146. Because the other parts are all connected they also stop, including the hammer sleeve. The hammers, however, which have all been moved upwardly in unison, continue upward due to their gained inertia carrying the rubber members 177 well up through the slot 72. The upward movement of the hammers only being stopped by the rubber members meeting with resistance or if they did not strike anything, they would be stopped by the shoulder 174 on the base of the hammer bottoming in the ends of the slots 184. The hammers, after striking their blows, return by gravity to the position shown in Fig. 10.

It will be noted that the upward movement is positive, up to a certain point and that they travel together. After the support for the hammers stops moving, however, they then move independently except for the fact that they all started together, for the rest of their travel. Thus, should one hammer meet an obstruction which is lower than that met by the other hammers, this particular hammer can stop in its upward travel, allowing the others to continue to the end of the stroke. Furthermore, the blow struck is a single sharp blow and independent of the length of time the circuit is held closed, hence a single impression is made and no blurred or smudged figures result because the hammers were held in printing position too long.

The recording mechanism housing

As previously stated, the recording mechanism is supported by the side housing 16 over the base housing and in spaced relation thereto.

The recording mechanism housing carries the idle time motor and the clock time motor, which may be the usual synchronous clock movements. It also carries the ribbon and its reels, the take-up reel being driven by the ribbon cam from the lower housing. It also carries the indicator wheels, some of them being operated manually, some by the clocks, and some by the piece counter solenoid which may be connected to an external circuit.

It includes a frame that comprises a pair of side plates 210 and 211 held in spaced relation by top cross member 212 and a bottom cross member 213. Preferably, the side plates are provided with rectangular bosses 214 and 215 between which the cross members are secured. As can best be seen in Fig. 8, the cross members each comprise an intermediate web-like portions 212a with a reinforced rib 212b and provided with enlarged end portions 212c designed to be seated on the bosses 214. They are held in place and the plate thus secured in rigid parallel relation by screws which extend through the walls and are threaded into bosses 212d in the web of the cross members. The cross member 212 is provided with a notch 216 adapted for engagement by the lock previously mentioned. The printing ribbon, which is of inked fabric is supported by reels at the ends of the frame being trained along the underside of the frame above the paper tape. The ribbon is moved by a ratchet and pawl mechanism operated from the cam 206 which, as previously stated, was operated by the same solenoid and linkage which operates the printing hammers and the paper tape. It will be noted that the cam has only one shoulder 217 on it and that, therefore, the mechanism which it operates is only moved once for each revolution of the cam, and that the ratchet wheel which may have 24 teeth on it requires 24 operations of the solenoid for one revolution.

As best shown in Figs. 7, 10 and 11, the ribbon supporting mechanism includes a ribbon reel disposed between the side plates 210 and 211 at the lower front end thereof. The ribbon reel has a pair of end bells 220 and 221, the end bells being provided with central bosses 222 and 223 adapted to support a sleeve 224. The end bell 221 is integral with and also constitutes the head for a stem 225 which is journalled in a boss 226 on the plate 211. A rod 230 having a head 231, extends through the end bell 220 with the head engaging the end bell 220 and the end being threaded into a central threaded opening in the end bell 221. The head 231 provides a bearing for the reel in the plate 210, and, as can be seen, fits flush with the plate. The stem 225 provides means whereby friction may be applied to the reel to prevent it from turning easily and for holding the ribbon taut. To this end a pair of lock nuts 233 are adjustably threaded on stem 225 and a washer 234 next to the lock nut is in engagement with a helical spring 236 which surrounds the stem, the other end engaging the face of the boss 226. The spring, the tension of which may be adjusted by the lock nuts, pushes the stem 225 outwardly and urges the end bell 221 into frictional engagement with the side plate 211. The reel is thus frictionally restrained against rotation.

As can best be seen in Fig. 10, the ribbon 238 is drawn over a rod 240 which is secured between the two side plates, thence under the bottom cross member 213, and onto the take-up reel.

The take-up reel is constructed in the same manner as the other reel, the difference being that stem 242, which corresponds to the stem 225 in the other reel has secured to it a ratchet gear 243. The reel is slotted at 244 to receive the end of the ribbon.

As best shown in Figs. 9 and 23, the ratchet and pawl which drive the ribbon take-up reel includes a generally triangular bracket plate 246 which is secured to the lower housing wall 37 by studs 247. Pivotally secured on the back of bracket plate by a pin 248 is a cam lever 249, one end of which extends from behind the bracket and is held against the cam 206 by a spring 251, one end of which is attached to a pin 252, on the upper end of the bracket and the other end of which is secured to an ear 253 of a pawl 254 pivotally secured to the lever at 255. As best shown in Fig. 23, the spring 251 not only holds the end of the lever 249 against the cam but also holds the pawl with its tooth 256 in engagement with the teeth of the ratchet gear 243. An assist pawl 258 is pivotally secured to the outside of the bracket with the same pin 248 that holds lever 249. It is provided with a tooth 259 and is held in engagement with the ratchet gear 243 by a spring 261 which has one end attached to a pin 262 on the bracket and the other end to a pin 263 on the pawl. In operation, the end of the lever 249, being held against the cam 206 by the spring 251, rides up and down on the cam once for each revolution. The pawl 254 engaging with the teeth on the ratchet gear 243 causes that gear to be gradually turned, the assist pawl 258 operating in the usual manner, to slowly wind up the ribbon on the take-up reel. As previously stated, this movement is so slow that the ribbon is used up in one pass through the machine, eliminating the necessity of a rewind mechanism and providing for more uniform printing and longer life.

*The recorder mechanism*

The recorder mechanism includes a plurality of printing wheels adapted to print the characters as shown in Fig. 18, except for the operator's number which is determined by the number on the key. A clock motor is connected to the wheels for recording the information as to date and hour and runs continuously so long as current is supplied. An idle time motor is provided being connected to record the idle time. The symbol wheel is operated manually, and the count wheels are operated by a solenoid.

A brief description of a circuit which may be effectively used to carry out the intended function of the apparatus is in order at this time to better correlate the remainder of apparatus. A circuit diagram is shown in Fig. 19. It will be appreciated that this circuit is merely exemplary of one of the many uses to which the machine may be put, however, and it is not intended to limit or restrict the scope of operation thereof.

Power is supplied from a 60 cycle 110 volt line L1 and L2, being brought into the device through the line cord 21.

The time of day and day of the year are initially to be set on the appropriate recorder wheels and will run continuously except for interruption in power supply, the leads to the clock time motor 270 are broken as indicated at X—X. These leads connect, one directly to terminal L2, and the other, to terminal 1 and through the jumper to L1. The connections from the motor to the recorder mechanism will hereinafter be described in detail.

The counting mechanism is operated by the counting solenoid 271, which solenoid is adapted to be controlled from an external circuit through a switch 272. The switch 272 can be connected so as to be actuated by the parts being made or through some controlling mechanism affecting the production by the machines. This switch connects through the lines 273 to the terminals S1 and S2.

The leads 274 from the solenoid connect directly to the terminal S1. The lead 275 connects to terminal 1, which, as previously stated, connects by the jumper to line L1. The circuit to main line L2 is connected from terminal S2 by a jumper to terminal 4 and by a second jumper from terminal 4 to terminal 3 which is connected by line 276 to terminal 3 on the "on" "off" switch 277 and thence through the switch from terminal L2 on the switch by a line 278 to terminal L2. The switch 277 is closed by the operator's key as will later be pointed out.

The idle time circuit is one whereby elapsed time is accumulated either by the failure of the machine to be operating, in which event a relay 280 may be connected in the machine motor circuit, not shown, to automatically register the idle time; or the relay or a switch may be connected to some part controlling the operation of the machine. "Dialed" idle time may also be obtained by the symbol knob 33 which can be turned to the appropriate symbol previously assigned to the knob. The symbol knob controls an idle time cam 281 when set to the symbol "A," for instance, which may indicate normal operating time, the idle time switch 282 is open as shown.

The automatic idle time is controlled by the relay 280 which is connected by leads 283 and 284 to terminals 3 and 5. Terminal 5 is connected directly to the idle time motor 285 by lead 286, and to the idle time switch 282, by lead 287. The other lead 288, from the idle time motor, connects to terminals 1 which is connected by jumper to the line terminal L1. Terminal 3 then connects through the line 276 to the "on-off" switch which connects back through line 278 to line terminal L2 to complete the circuit. This circuit, then is not energized when the "on-off" switch is in the "on" position. The "on-off" switch is controlled by the operator key 32.

The idle time switch then is connected by the leads 287 and 293 to terminals 3 and 5, these leads being in parallel with the leads 284 and 283. It will be seen that either switch 280 or 282 may close this circuit, providing the "on-off" switch is closed.

It will also be noted that the pilot light 290 connects to terminals L1 and terminal 5, as indicated by the broken line Y—Y. The pilot light will then light when idle time is being accumulated. This light may be a red light as provided by the lens 291.

The last circuit is the printing circuit which causes the solenoid 136 to be energized, to move the paper tape, cock the printing hammer and move the ribbon cam. It may be energized manually by the switch 295 or by the automatic printing cam 296 which controls the opening and closing of the automatic printing switch 297. The operations of this cam will be discussed later in detail.

The printing solenoid 136 is connected by the lead 300 and 301 to terminals L1 and 6. Power from the line L2 is supplied through L2, lines 278, "on-off" switch 277, line 276 to terminal 3, which is connected by the jumper to terminal 4. Terminal 4 is connected by leads 302 and 303 to the manual switch 295 and the automatic switch 297 respectively. The return leads 304 and 304' from the switch 297 and 295 respectively, connect to terminal 6, completing the circuit. From the foregoing, it will be apparent that there is provided means for indicating the number of the man operating the machine, the time the machine is idle, the count of the articles or operations made and the day of the year and time, as shown in Fig. 15.

All of this information is recorded by the combination of the number or printing wheels and the operator key. These wheels as well as the key are so positioned that the striking or printing hammers strike against the under side of the paper tape forcing it into contact with the printing ribbon which is backed up by the printing wheels and key. As previously pointed out in connection with the circuit description, the printing can be effected at any time by closing the circuit and can also be effected automatically by a cam controlled switch which is operated by the clock.

The operator key section

As previously stated, the device is adapted to be controlled by an operator's identification key. This key, when inserted in a key barrel and turned, closes the switch 277 and also positions a printing number on the key so that during a printing operation the number is reproduced on the tape.

The side plate 211 is provided with a boss 305 in which a key barrel 306 is disposed, it being locked in position by a hollow head set screw 307 disposed in a threaded opening 308.

As best shown in Fig. 25, the key barrel comprises a sleeve, the one end 309 of which slips into a bore in the boss 305, an opening 310 being provided for the reception of an end of the hollow head screw 307. A locating pin 312 for the key is carried on the other end of the barrel, having a head which is disposed inside the barrel. The barrel is provided with an opening 313 in its side whereby the switch 277 may be operated by the key.

Figure 12:
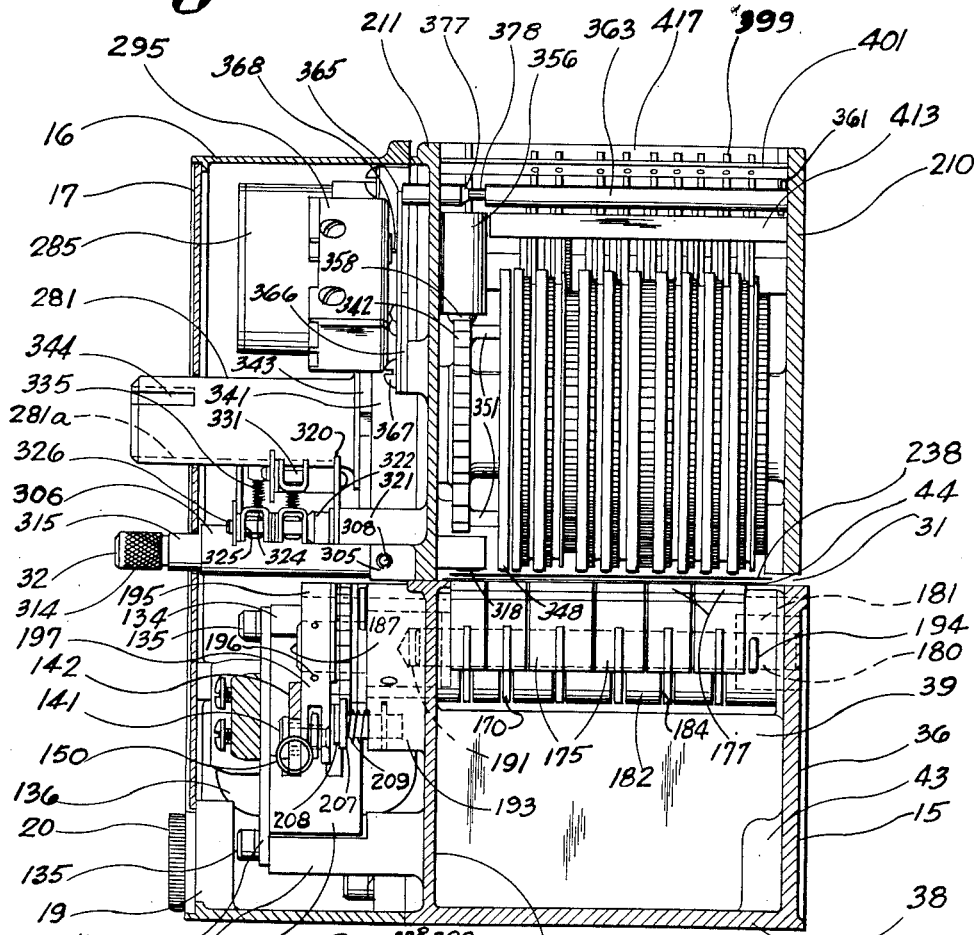
Fig. 12 is a sectional view taken on the line 12—12 of Fig. 10 with one of the covers removed and showing the number wheels in full lines.

The key, Fig. 24, preferably comprises a cylindrical body 315, the one end of which is provided with a knurled handle 314. The body is of a size to provide an easy sliding fit in the barrel and has a longitudinally extending groove 316 which provides clearance for the locator pin head 312 and guides the key in its travel when it is inserted into the barrel as well as to provide clearance for the switch roller, as will later appear. The end of the groove 316 terminates in a circumferentially extending portion 317 which allows the key to be turned for about 90 degrees after it is fully inserted in the barrel. The end of the key carries the type bar 318, that is so supported that the surface thereof lies in the plane of the cylindrical body. The bar may be secured in place by soldering, or if desired could be made integral with the rest of the key. It is so positioned that when the key is in the barrel and turned, it lines up opposite to the printing hammer. This is best shown in Fig. 12.

The key is held in place by a spring detent which enters into a notch 319. The key switch 277, or "on-off" switch, is supported on a bracket 320.

The key switch bracket 320, Fig. 9, is supported on the plate 211 by posts 321, integral with and extending outward from the plate 211, one of which can clearly be seen in Figs. 6 and 7, the brackets being held onto the posts by hollow head screws 322 which extend through the bracket into the posts. This same bracket also supports the switch 282 which is operated by the idle time dial cam.

Figure 26:
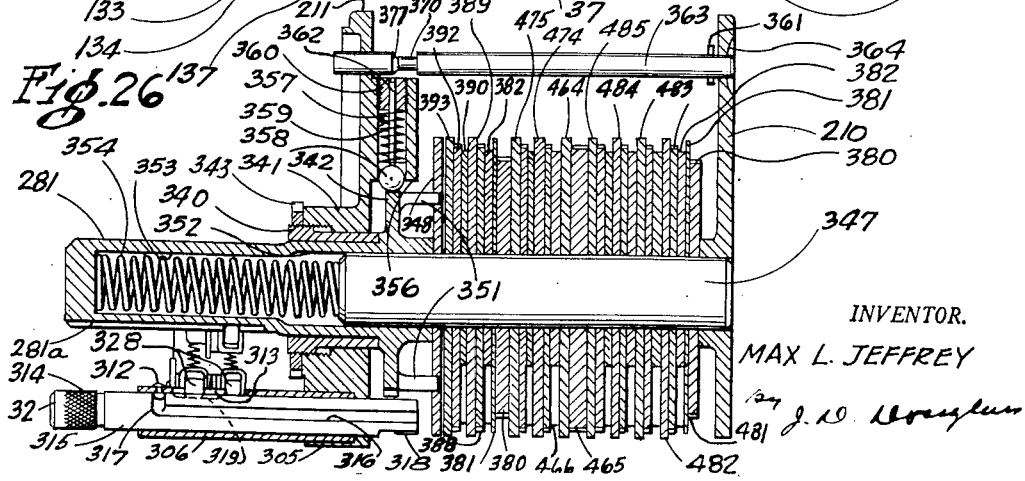
Fig. 26 is a vertical medial section taken through the symbol wheel shaft and the character wheels with surrounding parts omitted to more clearly show the structure.

In the case of the key, two separate levers are provided, one of which serves as a detent to hold the key in position and the other of which operates the contacts in the switch 277. Each lever includes a U-shaped base 324 which provides downward extending ears 325 that are journalled on a pin 326 carried by the bracket. The two levers are held on the pin by a cotter pin 327. Each of the levers is provided with a roller 328, Figs. 9 and 26, which is opposite to the window or opening 313 in the key barrel and adapted for engagement with the key. The rollers on each of the levers extend through the opening 313 and for a short distance into the key barrel. When the key is inserted in the barrel, the groove 316 provides for clearance with the roller. After the key is in the barrel, the roller on the outside lever, as seen in Fig. 26, rolls into the groove 319 when the key is turned, as previously mentioned, acting as a detent for holding the key in position. The roller on the inside lever, when the key is turned, is rolled out of the groove 316 onto the surface of the key, thus raising the lever.

Each of the levers is provided with an arm 329 which extends over the switch 277. A helical spring 335 is disposed with one end over a lug on the arm 329 and the other end in engagement with the other switch lever arm for the switch 282.

A similar switch lever 330 is provided for the idle time switch 282, being journalled on a pin 331 also carried by the bracket 320 above the pin 326. In this case, the roller on the lever is engageable with the idle time cam 281, it being shown in the groove 281a in which position, as seen in Fig. 19, the switch is "off." The arm of the lever 330 extends over the operating pin 334 in a similar manner that the arms 329 engage the operating pin 333 of the "on-off" switch 277, and the helical spring 335 engages with a lug on the arm 330, thus both of the switch levers are pressed outwardly or toward the switches which then operate to hold the switch open until such time as the key cam is moved or the idle time cam is moved to move one or the other or both levers toward each other and allow the respective circuits to close.

As previously stated, the outward of the two bottom levers serves merely as a detent. In this case, its tension spring is engaged at one end on a lug on the lever and at the other end on a lug on the housing for the switch 282.

*The idle time cam section*

The idle time may be caused to accumulate on the counter, either by external means or under control of the operator. When under the control of the operator, it is started by the symbol wheel which moves the idle time cam and the position of the symbol wheel determines the character to be printed, which may indicate the cause for the idle time. In order to move the wheel, a release button must be pressed which permits the wheel to be turned as long as it is depressed. This same release button operates the printing switch 295 so that printing is effected when the symbol wheel is set and the button released. This circuit is, however, under control of the "off-on" switch 277 that is controlled by the operator key.

The symbol wheel shaft assembly, the shank of which is also the idle time dial cam 281, as best shown in Fig. 26, is rotatably journalled in an adjustable bushing 340 which is disposed in threaded engagement with a boss 341 on the plate 211. The bushing 340 may extend through the wall or plate and abut the side of a star wheel 342 carried on the shaft 281. The bushing 340 is locked in adjusted position by a lock nut 343. The end of the shaft 281 is adapted to extend beyond the cover plate 17 and has secured thereon the symbol dial control knob 33 (Fig. 1) which is provided with a lug for engagement in a keyway 344 (Fig. 6) to enable the same to be secured in a predetermined position, the knob being secured to the shaft by a set screw 345 (Fig. 1).

A shaft 347 is provided for supporting the number wheels and the symbol wheel 348. This shaft has one end secured in an opening in the plate 210, being secured therein by a hollow head set screw 349 disposed in a threaded boss 350 (Fig. 7). The other end of the shaft extends into a counter bore 352 in the shaft 281. The shaft 281 also has a smaller bore 353 extending throughout most of its length and which houses a helical compression spring 354, one end of which engages the end of the bore 353 and the other end of which presses against the shaft 347 to thus urge the symbol wheel shaft assembly outward.

The star wheel 342, as can best be seen in Figs. 11 and 26, as the name implies, is provided with a saw toothed periphery which cooperates with a ball detent to hold the same in any one of a number of predetermined positions, in this case 20 positions corresponding to the symbols A to S and one blank position on the symbol wheel 348. Prongs 351 are provided on the star wheel 342 to engage the symbol wheel to rotate it in unison with the knob 33.

The ball detent includes a boss 356 integral with the plate 211, diametrically above the symbol wheel shaft and opposite to the star wheel having a bore 357 in which is disposed a ball 358, the ball being pressed downward into the notches on the star wheel by a helical spring 359, one end of which engages the ball and the other end a plug 360 at the upper end of the bore.

Means is provided whereby the symbol wheel cannot be moved accidentally and whereby, when it is moved, printing occurs. To this end a rod 362 is disposed in the bore 357 one end of which rests on the ball and the other end of which extends upward through an opening in the plug. Any attempt to move the wheel is blocked by the ball being raised, and it in turn raising the pin which engages with the side of a manual printing control and symbol wheel release shaft 363. The release shaft extends across and is slidably journalled in the plates 210 and 211. The operating end of the shaft is disposed in a small circular depression 364 in the plate 210, it being substantially flush with the remainder of the outer wall to provide against accidental displacement. A pin 361 secured in the shaft at the inner face of the plate 210 limits the outward movement of the shaft. The other end of the shaft extends beyond the plate 210 and is engaged by a leaf spring 365 (Fig. 6) carried on a bracket 366 secured in the plate 211 by screws 367. The bracket 366 also supports the switch 295. The operating pin 368 is adapted to be moved by the same leaf spring 365 which engages the shaft 363. The spring holds the shaft 363 to the right as viewed in Fig. 26 and when the shaft is pushed to the left, against the pressure of the spring, the spring also operates the switch.

The shaft 363 is provided with a reduced portion 378, the left side being conical in section to provide a cam surface 377. When the shaft is moved to the left, the rod 362 may rise into the notch, provided by the reduced portion, allowing the ball 358 to rise out of the depressions on the star wheel when it is turned. The wheel may then be turned to the desired position. Since the switch 295 was closed when the print shaft 363 was first moved to unlock the ball detent, the printing circuit was energized and, upon release of the shaft, printing is effected. The shaft 363 may be moved at any time to effect manual printing. The print shaft actuating end is accessible, as shown in Fig. 3, through an opening in the cover 25.

Idle time recorder

Figure 8:
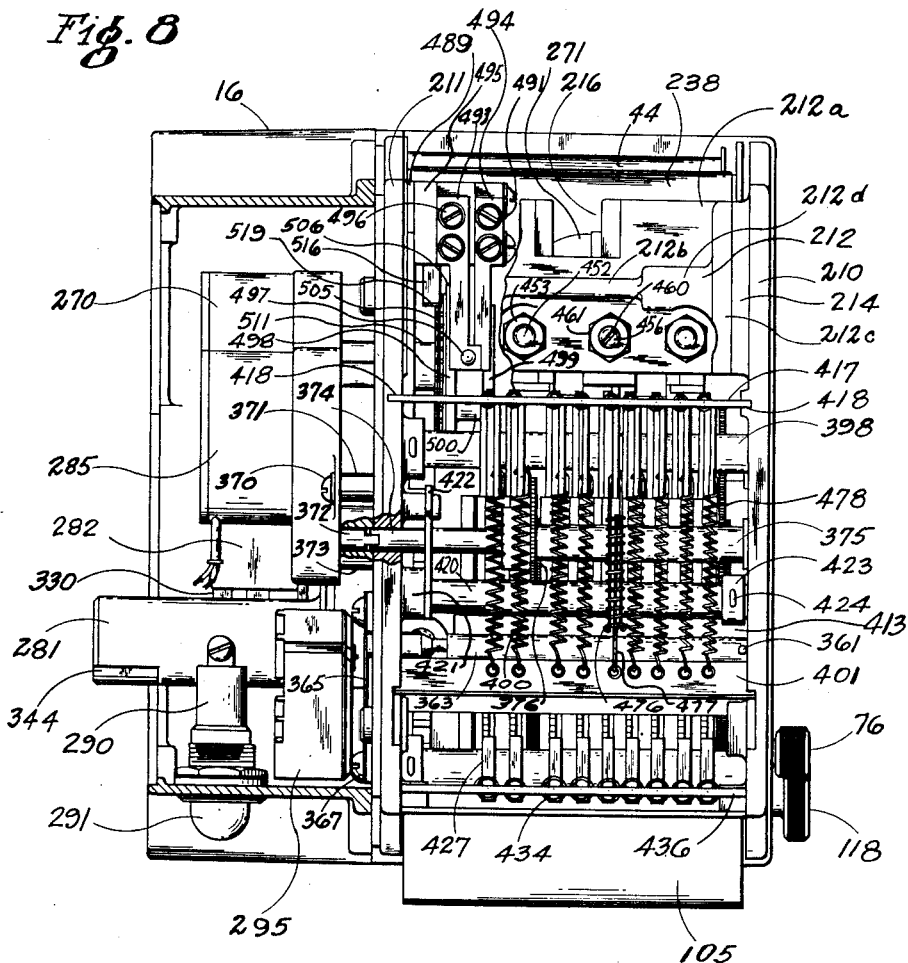
Fig. 8 is a similar view taken from the top of the device.

The idle time clock motor 285 is secured on the plate 211, Fig. 9, by screws 370 that extend into outwardly extending projections 371 on the plate. It may be of any conventional type, and as shown in Fig. 8 is provided with an operating shaft 372 which extends into a bored boss 373 and into driving engagement with a counter shaft 374. The counter shaft 374 is a stepped shaft, having an enlarged portion 375, the end of which is journalled in the plate 210, the small end 374 being journalled in the boss 373. A spur gear 376 is carried by the shaft, adjacent the shoulder formed by the step, being rigidly secured thereto. This gear is in direct driving engagement with the idle time counter, which in this instance is arranged to record from zero to 99 hours and 59 minutes, in hours and minutes.

As previously stated, all of the counter wheels are rotatably supported on the same shaft. This enables one shaft to support assemblies having the several discrete purposes of accumulating idle time, counting the number of pieces or operations, and showing the day and hour.

The idle time register assembly includes a gear which carries cams that operate a cam lever assembly. The cam lever assembly operates the register wheel which registers minutes and this wheel in turn carries a cam which operates a second cam lever assembly which in turn operates the hour register wheel. Means is provided which, when the cover is on, prevents the registering wheels from being turned other than by the clock and which may be moved when the cover is removed to unlock the cam levers to allow the wheels to be set by hand to the desired starting time, which would normally be zero.

The composite gear and cam is shown in Figs. 27 and 28. It is fabricated from three plates, the plate 380 being in the form of a spur gear in this instance having 80 teeth. Next to the gear is a separation plate 381 and on the other side of the separation plate is a cam 382 having two cam lobes 383, 180 degrees apart.

The cam lobes each include the rise 383a, the dwell 383b and the drop-off 383c. As can be seen, the three plates are secured together by rivets as shown. The cam gear is provided with a central aperture 384, which is surrounded by a thin boss 385, the boss serving to provide a slight separation for the gear from its adjacent element and the aperture permitting the same to be rotatably moved on the shaft 347. The gear portion 380 is in mesh with the drive gear 376.

Adjacent and to the left of the drive gear is the minute register wheel, Figs. 29 and 30. This, like the cam gear, is fabricated of three plates held together by rivets. It also is provided with the central mounting hole 386 and with the annular spacer bosses 387. It is provided with a ratchet gear 388, which, in this instance, has 120 teeth. Adjacent the ratchet gear is the numbers or printing wheel 389 which carries on its periphery two sets of numbers each running from 00 to 59. Flanking the number wheel is the cam 390 which is exactly like the cam 382 on the cam gear.

Finally, the last wheel in the assembly, Fig. 31 and Fig. 32, is the hour wheel. This wheel is made up of two plates, 392 being the ratchet gear and 393 being the hour printing or number wheel, which bears the indicia 00 to 99. In this instance, the ratchet is provided with 100 teeth. It will be noted that, since this is the last wheel of this group, no cam is needed or provided.

At this point, it may be well to state that the idle time register and the clock time register are substantially the same in structure, the difference being that, since the idle time is one which is usually set the most often, usually at the start of a job, it registers hours and minutes up to 99 hours and 59 minutes. The clock time gives the year, day, hour and minute, and, therefore, necessarily has a greater number of wheels.

As previously stated, the cam gear 380 is driven by the pinion 376, and the cam on this gear operates the ratchet lever mechanism which turns the number wheel. The manner in which this is accomplished is best shown in Fig. 33. Here it will be noted that the cam has resting thereon the end 395 of a follower lever 396.

The follower lever includes a body having an opening 397 whereby it may be pivotally disposed on a shaft 398. The lever turns upward, as shown, to allow it to clear the shaft 374—375 which carries the pinion 376. An upwardly extending arm 399 is apertured at its end to receive an end of a spring 400, the other end of which is hooked into a bar 401 disposed in slots 402 in the plates 210 and 211 and extending between the two plates. The spring 400 urges the arm 399 counterclockwise as viewed in Fig. 33, causing the follower to be held against the cam. When the cam is rotated, the entire follower rocks on the shaft 398.

This motion is communicated to the ratchet lever which is supported by the follower lever. To this end the follower lever has secured at the lower end, at one side, a spacer element 404 and adjacent the spacer element is a member 405 which extends upward beyond the spacer element to provide a gap 406 between it and the body of the follower lever. The ratchet lever 408 is pivotally journalled on a pin 409 secured in the follower lever and the member 405. It will be noted that the pivot point for the ratchet, which is the pin 409, moves with the follower lever in an arc to the left and right as viewed in Fig. 33 resulting in a backward and forward movement of the ratchet lever.

The ratchet lever is provided with a forwardly extending portion which also curves around the shaft 374 as indicated at 410 and is provided with a downwardly extending ratchet tooth engaging point 411. From this point, it rises perpendicularly to provide a face 412 which is adapted to abut a stop bar 413 secured to and extending between the side plates 210 and 211. This bar thus limits the forward movement of the ratchet lever. The point 411 of the ratchet lever is held in engagement with the teeth of the ratchet by a spring 415, hooked in the rearwardly extending end 416 of the ratchet lever and having the other end hooked in a bar 417. The bar 417 extends between the plates 210 and 211, being seated in slots 418, Figs. 10 and 8.

In order to prevent overtravel of the ratchet wheel, on forward movement of the ratchet lever, I provide means to prevent the ratchet lever from jumping out of engagement with the teeth. This includes a rod 420 which extends across and is journalled in the side plates 210 and 211 above the ratchet levers. One end of the rod is journalled in a boss 421 on the wall 211, the rod being of reduced cross section at that end and having secured thereto at the shoulder a flag lever 422. The other end of the rod is pinned in a bearing bushing 423 by a pin 424, one end of the bushing being of reduced cross section and rotatably journalled in the wall 210.

It will be noted that the ratchet lever is provided with an inclined upper surface 425 which slants rearwardly and upwardly as can best be seen in Fig. 33. In the forward position of the ratchet lever, which is the position where the follower has just dropped off the dwell 383b, the surface 425 is very closs to the rod 420. So close, in fact, that the ratchet engaging tooth cannot rise sufficiently far to allow the ratchet gear to rotate, because if it attempts to do so, the ratchet lever engages the rod. As the follower lever is raised by the portion 383a of the cam lobe, however, the pivot 409 for the ratchet lever is moved clockwise, which draws the ratchet lever to the right, disengaging it from the rod 420 and allowing the point 411 to drop off the ratchet tooth with which it was engaged and to engage the next succeeding tooth.

Reverse movement of the ratchet gear 388 is prevented by a pawl of which there is one for each ratchet gear and which pawls each comprise a body portion 427 having an opening 428 which allows it to be pivotally journaled on a shaft 429 supported between the side walls 210 and 211.

One end of the shaft is held in a boss 430 on the wall 211 by a cotter pin 431 which extends through the boss and the shaft, Fig. 11.

The upper end of the pawl is provided with an upstanding lug 433, Fig. 10, and a compression spring 434 has its lower end disposed around the lug and bearing against the pawl body, while the other end of the spring engages a lug 435 on a bar 436 which extends between the plates 210 and 211, being seated in recesses on said plates, to hold it in position. The tendency of the spring is to rotate the pawl counterclockwise. The lower end of the pawl is provided with a ratchet tooth engaging point 437 which is held in engagement with the ratchet gear.

It will be noted that the cam follower, the cam rotating counterclockwise as viewed in the figures, rises slowly, remains on the dwell for some time and then suddenly drops off. During the drop off, the ratchet lever moves quickly forward, the point 411 engaging the ratchet tooth and moving it quickly one tooth. The movement is so quick that it moves the printing wheel into printing position with scarcely any time lag and thus reduces the possibility that printing will occur during the time the number wheel is moving which would result in blurring of the printing.

Since it is desirable that the number wheels be movable even when in the position shown in Fig. 33, in order to set the wheels to the desired position, the rod 420 is formed with a flat surface on one side 420a, which, when the rod is rotated, so that this surface is opposite to the slant surface 425 on the ratchet lever, provides a clearance allowing the lever to rise sufficiently to enable the wheel to be turned manually, which is done by engaging the fingers, or a stylus, with the surface of the wheel.

In order that the rod be returned to the proper position so as to hold the ratchet lever and prevent accidental turning of the wheel, it is provided with a flag 439 secured to the rod at one end. This flag engages a stop 440 shown in Fig. 10 when in the locked position. It may be rotated approximately 180 degrees to rotate the rod and when rotated counterclockwise from the position shown in Fig. 10, the end 441 engages the bar 401, this being the proper position for cooperation of the flat 420a with the ratchet lever. In any rotated position other than that shown in Fig. 10, the cover cannot be replaced over the mechanism and locked. Therefore, the flag not only furnishes a convenient lever for turning the rod, but also indicates the position of the rod and prevents replacement of the cover until the rod is in the correct position for positive operation of the mechanism.

Piece counting mechanism

The piece-count recording mechanism is actuated externally by the switch 272 which may be operated by the parts being made or through some control mechanism on the machine. As described above, this switch is connected to a counting solenoid 271 which, in turn, operates the recording mechanism to record each piece counted.

The counting solenoid, Fig. 22, comprises the customary E frame stator 442 with a winding 443 and a T-shaped armature 444. The outer legs of the stator extend beyond the winding at 445 and have guides 446 for the armature riveted onto them. These guides are small rectangular pieces of sheet metal extending inwardly from the outer legs of the stator to form a channel in which the head 447 of the armature may be slidably disposed and which serve to keep the motion of the armature in a vertical line.

The solenoid is mounted in the recorder section of my device between rubber mounts to avoid damage to the soft iron laminations of the armature and stator from shock and to minimize the noise of operation. A rubber pad 448, Fig. 10, is inserted in a recess provided for it in the bottom cross member 213. The pad is cut slightly larger than the recess so that it is held in place by the friction between it and the sides of the recess. The stator rests on this pad with the extended legs 445 in an upright position. A clamping member 449 of U shape in plan view, Fig. 35, is disposed with its legs extending transversely over the legs 445 of the solenoid stator provides means for holding the solenoid in place. The opening at the top of the U is necessary so that the counting recorder arm 462 will have clearance to operate as hereinafter described. Each leg 450 of the U-shaped member 449 is formed in the shape of a channel and a rubber strip 451 is pressed therein. Hollow-head set screws 452 are threaded into the upper cross member 212 so as to abut the upper part of the clamping member 449. A recess 450a is provided in the top of each leg of the member 449 to receive each screw and prevent the clamping member from sliding when the screws are turned down onto it. Lock nuts 453 are provided for the screws to assure that they will not work loose because of the vibration of the device.

The head 447 of the armature is formed with a yoke 455 having a transverse rectangular opening 454 to receive the operating member of the recording devices described hereafter. This may be done by soldering the yoke to the head of the armature. Directly above the yoke 455 on the underside of the cross member 212 is a large headed bolt 456. This bolt is specially constructed with a large head 457 in which is embedded a rubber pad 458. The bolt is threaded through a boss 459 on the cross member 212 and is held in place against vibration by a lock nut 461. The end of this bolt has a slot 460 for a screw driver to allow adjustment of the bolt. Thus, the bolt provides an adjustable stop for the upward travel of the armature, as well as cushioning the shock of stopping the upward stroke of the armature.

The piece-recording mechanism is similar to the idle time recorder except that it is operated by movement of the solenoid rather than by a clock motor. It includes three number wheels, each of which counts from 0 to 99, thus enabling a total count of 999,999 to be made. The first number wheel is operated by a ratchet connected to the solenoid; this wheel in turn operates the second wheel which in turn operates the third wheel.

The ratchet, in some respects, is similar to that described for the idle time. It includes a body portion 467 of laminated construction disposed on the shaft 398 and having an arm 462 extending rearwardly from the body. This arm may be constructed of three laminations, the center of which does not extend above the shaft 297, which formation provides a gap similar to the gap 406 of the idle time recording devices. One of the side members extends upward to form an arm 468 exactly similar to the arm 399 described in connection with the idle time recording mechanism, and the other side member is similar to the member 405 described previously. A ratchet lever 408' is pivotally journalled therebetween, and, in all respects, the operation of this ratchet lever is similar to that described in connection with the idle time recorder.

The rearward end of the arm 462 is formed with a rounded end 463 which extends into the opening 454 in the yoke 455 on the head of the solenoid armature and is freely operable thereby. It can be seen that vertical movement of the armature provides an action of the ratchet lever substantially the same as is provided by the first cam of the idle time recorder and, therefore, rotates the piece counting recorder wheel in the same manner. The first wheel 464 in this series, Fig. 37, is similar in construction to the wheels of the idle time recorder except that the ratchet wheel 465 is somewhat heavier. This is desirable, since it is anticipated that this wheel will be operated much more often than any of the other ratchet wheels. A single lobed cam 466 is provided for this wheel comprising a rise 471, dwell 472 and drop-off 473. The wheel is numbered from 00 to 99. The next wheel 474, Fig. 26, is operated by a cam follower and ratchet system exactly the same as that previously described in connection with the idle time register except that since there is only a single lobe on the cam, this wheel is turned only one notch by the ratchet for each turn of the first wheel. This second wheel is identical to the first, except that the ratchet is of single thickness as it is in all the other wheels. The third wheel 475 is identical to the second except that, since it is the last in the series, no cam is necessary.

Because of the severe use to which it is expected the first wheel and its operating mechanism will be put, I provide a slightly different spring 476 to be used in connection with the upward extending arm 468. This spring is a compression spring of somewhat heavier wire and fewer convolutions than the tension springs 400 provided for all the other arms. Long U-shaped wire loops 470 are hooked in the attaching holes in the bar 401 and the arm 468. The legs of these loops are inserted through the spring 476 from opposite directions, and since the axis of the holes is 90 degrees apart, the wire loops do not interfere with each other. The ends of the legs on each loop are bent back over the convolutions of the spring farthest from the bottom of the U, holding the spring slightly compressed. This form of spring provides a slightly stiffer spring means to hold the weight of the armature of the solenoid as well as a stronger spring for more severe duty. In addition, it can be seen that the fracture of a single coil of the compression spring would not necessarily render the spring inoperative, since the adjoining coils next to the fracture would abut each other, being held in line by the legs of the U-shaped loops, and the spring action would continue. It is contemplated that the opening in the arm 399 should be in the form of a slot so that the top of the arm becomes a hook into or from which the spring may be easily removed.

As can be seen, the action of the compression spring 476 is to hold the upward arm 468 as far forward as the motion of the rearward arm 462 will allow. In turn, this holds the rearward arm up and, again in turn, holds the armature 444 of the solenoid in a position somewhat withdrawn from the stator 442. Thus, when the solenoid is energized, by closing of the switch 272, the armature is drawn into the winding, compressing the spring through motion of the arms 399 and 462 and cocking the ratchet mechanism. When the switch is thereafter opened again, the action of the spring 476 is to return the parts to their former position and in so doing operate the ratchet to turn the recording wheel to the next number.

As the first wheel 464 completes one revolution and passes from 99 back to 00, the cam follower of the second wheel following the drop-off of the cam operates the ratchet mechanism of the second wheel 474 to turn that wheel to the number following the one previously printed.

Similarly, the cam on the second wheel operates the third wheel 475. Since each of these wheels is numbered from 00 to 99, it can be seen that I have provided a mechanism which can count any number of pieces from 0 to 999,999.

*Clock time recorder*

The clock time recording mechanism is, in most respects, similar to the idle time recorder. The clock motor 270, Fig. 9, is mounted on the wall 211 in a manner similar to the idle time clock 285 and drives a similar shaft 477 which is journalled in the walls 211 and 210 through the same type of coupling. A pinion 478 similar to pinion 376 is fastened to the shaft near wall 210 but in a fixed spaced relation therefrom by a set screw 479. The pinion drives a cam wheel 481 similar to and interchangeable with that of the idle time recorder. The first numbered wheel 482, which records minutes, is also exactly similar to that of the idle time recorder. The other three wheels differ only in the numbers which they bear on their face and the number of lobes on the cams. The second numbered wheel 483, which counts the hours of the day, is numbered from 00-23 in four separate series and bears a four lobed cam 480, Fig. 38. This cam is similar to all the others except that the lobes 480a are only 90 degrees apart and the period of dwell is shortened correspondingly. The third wheel 484, which counts the days of the year up to 100, is numbered from 00-99 and is similar to the first two wheels of the piece counting recorder. The fourth wheel 485, which counts the hundreds of days, is numbered from 0 to 3 in twenty-four cycles and has no cam. Thus it can be seen that my device can record the day of the year from 00 to 399 and the time of day in hours and minutes using a 24-hour system.

The operation of this mechanism is similar to that of the idle time recorder.

Automatic printing cam and switch

In order to keep a running record of production, I have provided a mechanism which prints a record automatically every ten minutes while the operator's key 32 is in place. The electrical operation of this switch has previously been described. It is now my purpose to described the mechanical operation in full detail.

A bushing 486 carrying a single tooth 487 is journalled on the clock time shaft 477 at the opposite end from the gear 478 and affixed thereto by a set screw 488 in close juxtaposition to the side plate 211. The switch mechanism is mounted on a bracket 489 which is fastened to the side plates 211 with hollow-head screws 492. This mechanism comprises the switch contacts and a cam to cause the contacts to make or break the circuit at the proper time and means to turn the cam to operate the switch. More specifically, as is best shown in Figs. 8, 11 and 22, the switch consists of an upper contact spring 493 and a lower contact spring 494 mounted on one end in spaced lateral relationship on a stepped block 495 of Bakelite or similar insulating material by screws 496. The block 495 is fixed to the bracket 489 by screws 491 threaded into the bracket. The springs are made of some good electrical conducting material, such as phosphate-bronze, and form the operating parts of the switch. The mounting screws 496 also provide a convenient means of making electrical connection to the springs. At their outward ends, the springs are formed in an L shape with the shorter leg of the L of each spring directed toward the other spring. Thus, at this end, a part of the upper spring is directly above a similar part of the lower spring. Contact points 497 are carried by the springs at this point arranged to make contact when the springs are allowed to come together.

The cam member comprises two cams, a larger cam 498 and a smaller cam 499, held in fixed spaced relationship by a spacer 500, and a toothed wheel 505 separated from the larger cam 498 by a thin spacing sheet 506. The two cams are of substantially the same form, each having two lobes comprising a rising portion 507, a dwell 508 and a drop-off 509. These cams, as well as the spacer 500 and the spacing sheet 506, are formed of some insulating material such as Bakelite. The toothed wheel 505 containing 20 teeth 510 may be formed of several layers of sheet metal stampings for ease of manufacture. These units are riveted together with the cams arranged so that there is a slight angular displacement between the drop-off portions 509 so that the drop off from the larger cam 498 occurs a few degrees (approximately 5 to 10 degrees) before that of the smaller cam 499. This assembly is rotatably journalled on a bushing 511 which has a smaller portion extending through the cam assembly and a larger diameter portion which serves to space the cam assembly from the bracket 489. A screw 514 carrying a flat washer 515 to prevent the cam assembly from sliding over its head, extends through the bushing 511 and is threaded into the bracket 489 in such a position that the switch springs 493 and 494 ride on the cams 498 and 499 respectively at their outer ends. Thus, as the cams are turned in a counter-clockwise direction in Fig. 11, the contacts 497 on the springs are held apart by the cams throughout most of the rotation, but at the two points of drop off, since the drop from the larger cam 498 takes place first, there is a momentary contact allowing the current to flow and energize the printing solenoid winding 136 until the drop-off portion of cam 499 allows the lower spring to break the contact, de-energizing the coil and causing an imprint to be made on the tape as previously described.

The cam is turned by interaction between the toothed wheel 505 and the single tooth 487 on the bushing 486. This interaction is caused by the rotation of the bushing 486 with the shaft 477 bringing the tooth 487 into mesh with one of the teeth 519 on the wheel 505 and moving the wheel and cam assembly one notch for each revolution of the shaft. A spring pawl device comprising a leaf spring 516 in contact with the teeth 519 is provided. This leaf spring 516 is mounted by means of screws 517 on an outwardly bent portion 518 of the bracket 489 at an angle such that the pressure of the spring urges against the rotation of the wheel. At the same time, the tip 519 of the spring engages the back of the tooth which just passed the spring to prevent the wheel from reverse rotation.

The shaft 477 is driven by the clock motor 270 at the rate of one revolution per minute, and thus the cam assembly is rotated one revolution every twenty minutes. Since the switch contacts come together every half revolution, it can be seen that I have provided a device to cause the printing of a record every ten minutes during the time when the operator's key 32 is in place, since, as described above, the switch mechanism is inoperative unless the key 32 is in place.

Having thus described my invention, it will be evident to those skilled in the art that I have provided a compact device capable of keeping accurate production records as to the number of pieces produced, elapsed time either producing or idle, total elapsed idle time and by reason of symbols the cause for the idle time. It is evident that my device is easy to construct and to service containing many identical parts and is, therefore, a distinct improvement over other devices previously designed for the same purpose.

Having thus described my invention, I am aware that numerous and extensive departures may be made therefor, without departing from the spirit or scope thereof.

I claim:

1. A recorder comprising a base housing having side walls and a top wall, a paper tape reel having paper tape thereon disposed in one end of the housing between said side walls, said paper being trained over the top wall and a paper receptacle disposed on the other end of the housing for receiving said paper, said top wall being formed with an opening extending transversely across the wall and a plurality of printing hammers disposed below said top wall and operable through said opening to engage said paper, a side member secured to one of said side walls and extending upwardly beyond the top of said housing, a recorder housing carried by said side member and overhanging said base housing in closely spaced relation thereto, a plurality of record indicator wheels for said recorder housing disposed opposite to said opening in the top of the base housing, and a printing ribbon carried by said recorder housing below said indicator wheels.

2. A recorder comprising a base housing having side walls and a top wall, a paper tape reel having paper tape thereon disposed in one end of the housing between said side walls, said paper being trained over the top wall and a paper receptacle disposed on the other end of the housing for receiving said paper, said top wall being formed with an opening extending transversely across the wall, a plurality of printing hammers disposed below said top wall and operable through said opening to engage said paper, a side member secured to one of said side walls and extending upwardly beyond the top of said housing, a recorder housing carried by said side member and overhanging said base housing in closely spaced relation thereto, a plurality of record indicator wheels for said recorder housing disposed opposite to said opening in the top of the base housing, a printing ribbon carried by said recorder housing below said indicator wheels, and means for operating said hammers to move them through said opening in the base housing to strike the paper and move it into contact with said ribbon and force the ribbon and paper into contact with the indicator wheels.

3. A recorder device having a base housing, a plurality of printing hammers disposed in said housing, a paper tape carried in said housing above said hammers, a side housing fixed to one side of and extending above said base housing containing operating mechanism for said hammers and for feeding said paper tape through the device, a recording mechanism carried by said side housing in overhanging relationship to said base housing, said recorder mechanism having a plurality of indicator wheels disposed opposite to said hammers and an linked tape carried by said recorder between said wheels and said paper tape.

4. A recorder mechanism comprising a housing, a plurality of indicator wheels disposed in said housing and bearing indicia on their periphery, first clock means to actuate one group of said wheels, second clock means to actuate a second group of wheels, and a counting mechanism to actuate a third group of wheels, said first clock means adapted to run continuously, a switch in said housing connected to said second clock means to cause said second clock means to run only when a key is inserted into said switch, and a printing device disposed beneath said wheels in said housing adapted to print a record of the indicia on said wheels and responsive to said first clock means and said switch to print such a record at definite intervals while said key is in place.

5. A recorder mechanism comprising a housing, a plurality of indicator wheels disposed in said housing and having indicia on their periphery, a first clock means to actuate one group of said wheels, second clock means to actuate a second group, a counting mechanism to actuate a third group, said first clock means adapted to run continuously, a switch in said housing connected to said second clock means to cause said second clock means to run only when a key is inserted into said switch, said key having indicia and said switch being in such position that the key when inserted thereinto is in line with said indicator wheels, and a printing apparatus disposed in said housing beneath said wheels adapted to print a record of the indicia on said wheels and said key.

6. A recorder mechanism comprising a housing, a plurality of indicator wheels disposed in said housing and having indicia on their periphery, a first clock means to actuate one group of said wheels, second clock means to actuate a second group and a counting mechanism to actuate a third group, said first clock means adapted to run continuously, a switch in said housing connected to said second clock means to cause said second clock means to run only when a key is inserted into said switch, said key having indicia and said switch being in such position that the key when inserted thereinto is in line with said indicator wheels, and a printing apparatus disposed in said housing beneath said wheels adapted to print a record of the indicia on said wheels and said key, and responsive to said first clock means and said switch to print such a record at definite intervals while said key is in place.

7. A recorder device comprising an upper housing, a plurality of indicator wheels disposed in said housing and bearing indicia on their periphery, a first clock means to operate one group of said wheels, a second clock means to operate a second group, and a counting mechanism to operate a third group, said first clock means being adapted to run continuously, a switch in said housing connected to said second clock means to cause said second clock means to run only when a key is inserted into said switch, an inked ribbon carried on reels in said upper housing and trained between said reels beneath said indicator wheels, a base housing, a side housing fixed to said base housing and carrying said upper housing in fixed spaced relation to said base housing, a plurality of printing hammers disposed in said base housing beneath said indicator wheels, a paper tape trained between said hammers and said wheels, operating means enclosed in said side housing adapted to operate said printing hammers and to cause said tape and ribbon to move in the interval between the operation of said hammers.

8. A recorder device comprising an upper housing, a plurality of indicator wheels disposed in said housing and bearing indicia on their periphery, an inked ribbon carried on reels in said upper housing and trained between said reels beneath said indicator wheels, a base housing, a side housing fixed to said base housing and carrying said upper housing in fixed spaced relation to said base housing, a plurality of printing hammers disposed in said base housing beneath said indicator wheels, a paper tape trained between said hammers and said wheels, operating means enclosed in said side housing adapted to operate said printing hammer and to cause said tape and ribbon to move in the interval between the operation of said hammers.

9. A recorder mechanism comprising a housing, a plurality of indicator wheels disposed in said housing and having indicia on their periphery, first clock means to operate one group of said wheels, a second clock means to operate a second group, and a counting mechanism to operate a third group, said first clock means adapted to run continuously, a switch in said housing connected to said second clock means to cause said second clock means to run only when a key is inserted into said switch, said key having indicia and said switch being in such position that the key when inserted thereinto is in line with said indicator wheels, a printing apparatus disposed in said housing beneath said wheels adapted to print a record of the indicia on said wheels and said key, said printing apparatus being responsive to said second clock means and said switch to print such a record at definite intervals while said key is in place and a manually operated switch adapted to actuate said operating means at any time.

10. A recorder device comprising an upper housing, a plurality of indicator wheels disposed in said housing and bearing indicia on their periphery, an inked ribbon carried on reels in said upper housing and trained between said reels beneath said indicator wheels, a base housing, a side housing fixed to said base housing and carrying said upper housing in fixed spaced relation to said base housing, a plurality of printing hammers disposed in said base housing beneath said indicator wheels, a paper tape trained between said hammers and said wheels, operating means enclosed in said side housing adapted to operate said printing hammers, and to cause said tape and ribbon to move in opposite directions in the interval between the operation of said hammers.

11. A recorder device comprising a housing, a plurality of indicator wheels disposed in said housing and bearing indicia on their periphery, said plurality comprising one group responsive to a first clock means, a second group responsive to second clock means, a third group responsive to a counting mechanism and a single wheel adapted to be turned by knob means from without the housing, said first clock means adapted to run continuously, a switch in said housing connected to said second clock means to cause said second clock means to run only when a key is inserted into said switch, and a printing device disposed beneath said wheels in said housing adapted to print a record of the indicia on said wheels.

12. A recorder device comprising a housing, a plurality of indicator wheels disposed in said housing and bearing indicia on their periphery, said plurality comprising one group responsive to a first clock means, a second group responsive to second clock means, a third group responsive to a counting mechanism and a single wheel adapted to be turned by knob means from without the housing, said first clock means adapted to run continuously, a switch in said housing connected to said second clock means to cause said second clock means to run only when a key is inserted into said switch, a printing device disposed beneath said wheels in said housing adapted to print a record of the indicia on said wheels, and a switch in said housing operated by said first clock means connected to said printing device to operate said printing device at definite time intervals.

13. A recorder device comprising a housing, a plurality of indicator wheels disposed in said housing and bearing indicia on their periphery, said plurality comprising one group responsive to a first clock means, a second group responsive to second clock means, a third group responsive to a counting mechanism and a single wheel adapted to be turned by knob means from without the housing, said first clock means adapted to run continuously, a switch in said housing connected to said second clock means to cause said second clock means to run only when a key is inserted into said switch, a printing device disposed beneath said wheels in said housing adapted to print a record of the indicia on said wheels, and switch means connected to said printing device adapted to operate said printing device whenever said knob means is turned.

14. A recorder device comprising a housing, a plurality of indicator wheels disposed in said housing and bearing indicia on their periphery, said plurality comprising one group responsive to a first clock means, a second group responsive to second clock means, a third group responsive to a counting mechanism and a single wheel adapted to be turned by knob means from without the housing, said first clock means adapted to run continuously, a switch in said housing connected to said second clock means to cause said second clock means to run only when a key is inserted into said switch, a printing device disposed beneath said wheels in said housing adapted to print a record of the indicia on said wheels, a switch in said housing operated by said first clock means connected to said printing device to operate said printing device at definite time intervals, and second switch means connected to said printing device adapted to operate said printing device at any time said knob means is turned to change the record indicia on said single wheel.

15. A recorder device comprising a housing, a plurality of indicator wheels disposed in said housing and bearing indicia on their periphery, said plurality comprising one group responsive to a first clock means, a second group responsive to second clock means, a third group responsive to a counting mechanism and a single wheel adapted to be turned by knob means from without the housing, said first clock means adapted to run continuously, a switch in said housing connected to said second clock means to cause said second clock means to run only when a key is inserted into said switch, a printing device disposed beneath said wheels in said housing adapted to print a record of the indicia on said wheels, and a second switch in said housing operated by said first clock means, in series with said first named switch, adapted to operate said printing device at definite time intervals while said key is in place.

16. A recorder device comprising an upper housing, a plurality of indicator wheels disposed in said housing and bearing indicia on their periphery, first clock means to operate one group of said wheels, second clock means to operate a second group, and a counting mechanism to operate a third group, said first clock means being adapted to run continuously, a first switch in said housing connected to said second clock means to cause said second clock means to run only when a key is inserted into said switch, an inked ribbon carried on reels in said upper housing, and trained between said reels and beneath said wheels, a base housing, a side housing fixed to said base housing and carrying said upper housing in fixed overhanging relation to said base housing, a plurality of printing hammers disposed in said base housing beneath said indicator wheels, a paper tape trained between said hammers and said wheels, operating means enclosed in said side housing adapted to operate said printing hammers, and to cause said tape and ribbon to move in the interval between the operation of said hammers, and a second switch in said upper housing in series with said first switch adapted to actuate said operating means at definite time intervals while said key is in place.

17. In a device for printing a production record including a housing, a shaft journalled in said housing, a plurality of register wheels including time responsive wheels journalled on said shaft, operating means for said register wheels, and printing mechanism in combination with said wheels to record the reading thereon; means to indicate the reason for lack of production and the elapsed time comprising a symbol wheel carrying a plurality of symbols indicative of reasons for time spent out of production journalled on said shaft, a star wheel carried by said symbol wheel, spring detent means carried by said housing in engagement with said star wheel, a pin in engagement with said detent means and adapted to be moved thereby, means preventing motion of said pin and, therefore of said star wheel comprising a rod slidably journalled in said housing in position to be engaged by said pin, said rod having a portion of smaller diameter arranged to be slid into register with said pin thereby allowing movement of said detent means and star wheel, and switch mechanism on said housing to actuate said printing mechanism adapted to be operated by the movement of said rod to print a record each time said rod is moved into position to allow the symbol wheel to be turned.

18. In an apparatus of the class described, a symbol wheel adapted to be turned to a plurality of positions to register any of a number of different symbols, and means to prevent the turning of said wheel without printing a record of the status at the time of said turning comprising a star wheel fixed to said symbol wheel, spring detent means in engagement with said star wheel, means engaging said detent to restrict motion thereof, cam surface on said detent engaging means to allow motion of said detent means when said surfaces are moved to a release position, and switch means operated by said detent engaging means to actuate printing mechanism upon movement of said cam surfaces to said release position.

19. In a printing apparatus of the class described including a symbol wheel adapted to be turned to a plurality of positions to register any of a number of different symbols, means to prevent the turning of said wheel without printing a record of the status at the time of said turning comprising a star wheel fixed to said symbol wheel, spring detent means comprising a ball engaging said star wheel, a spring urging said ball towards said star wheel, a pin engaging said ball adapted to be moved thereby, a rod slidably disposed above said pin in a position to prevent movement thereof, cam surfaces on said rod to allow motion of said pin when said surfaces are moved into register with said pin, and a switch adapted to be operated by said rod upon sliding it to move said cam surfaces.

20. In a counting mechanism comprising a series of register wheels operated by ratchet means engaging toothed ratchet wheels on said register wheels; means selectively preventing or allowing manual adjustment of said register wheels comprising a shaft in close proximity to said ratchet means preventing disengagement of said ratchet means from the teeth of said ratchet wheels when said ratchet means is in a normal position thereby preventing movement of said register wheels, a flat surface on said shaft adapted to be rotated into register with said ratchet means to allow disengagement from said teeth to allow movement of said register wheels.

21. In a counting mechanism enclosed in a housing with a cover therefor and including a shaft in said housing, a series of register wheels journalled thereon operated by ratchet means engaging toothed ratchet wheels on said register wheels; means selectively preventing or allowing manual adjustment of said register wheels comprising a second shaft journalled in said housing in close proximity to said ratchet means preventing disengagement of said ratchet means from the teeth of said ratchet wheels when said ratchet means is in a normal position thereby preventing movement of said register wheels, a flat surface on said shaft adapted to be rotated into register with said ratchet means to allow disengagement from said teeth to allow movement of said register wheels, and lever means on said second shaft formed to be engaged by said cover, when said cover is in place, to prevent rotation of said second shaft from a movement-preventing position and to prevent replacement of said cover when said shaft is in a movement-allowing position.

22. A record printing device comprising means bearing type faces, ink carrying means trained beneath said type faces adapted to be moved intermittently in one direction, record receiving means trained beneath said ink carrying means adapted to be moved intermittently in the opposite direction, and impact means below said record receiving means adapted to be operated upwards quickly during the interval between movements of said ink carrying means and said record receiving means to imprint the record on said record receiving means.

23. In a printing device including means bearing type faces, a paper tape adapted to receive the record of the type, and an inked ribbon trained between said type bearing means and said tape, means engaging said tape to pull it in one direction in the interval between printing operations and means, operatively connected to said tape pulling means, engaging said ribbon to pull it in the opposite direction in said interval.

24. In a printing device including means bearing type faces, a paper tape adapted to receive a record of the type, and an inked ribbon trained between said type bearing means and said tape, means for moving said tape and said ribbon comprising a friction roll on one side of said printing device in pulling engagement with said tape, a ribbon reel on the other side of the printing device for winding up said ribbon, and a single operating means for said roll and said reel adapted to operate both said roll and reel in the intervals between printing action of said printing device.

25. A wiring circuit for a printing recorder mechanism operated from a source of power, comprising a plurality of inter-operative circuits including a counter circuit operated from said power source including an externally operated switch in series connection with a solenoid to actuate the counting device and a key operated switch to prevent such actuating unless the key is first turned, a first time recording circuit including a first clock motor in direct connection to said power source, a second time recording circuit including in series with said key operated switch, a second clock motor, a normally open switch adapted to be closed by a manually operated cam device, and a relay-operated normally open switch in parallel connection with the cam operated switch, and a printer actuating circuit including a solenoid to operate a printing mechanism, a cam-operated switch in series with said solenoid, said last named cam being operated by said first clock motor, a manually operated switch in parallel with said cam-operated switch, and said key-operated switch in series connection between said manually-operated and cam-operated switches and said power source.

26. A wiring circuit for a printing recorder mechanism including a counter circuit having an externally operated switch connected in series to a key operated normally open switch, then in series to a solenoid for actuating a counter device, a time recording circuit including a clock motor adapted to run continuously, a second time recording circuit including a second clock motor, a normally open switch adapted to be closed on the manual operation of a cam device, and said key operated switch in series, and a printing circuit including a solenoid to actuate a printing mechanism, a cam operated switch in series with said solenoid, said cam being operated by said first clock motor, and a manually operated switch in parallel with said cam operated switch, said printing circuit also including in series, the key operated switch of the second time recording circuit.

MAX L. JEFFREY.

REFERENCES CITED

The following references are of record in the file of this patent:

UNITED STATES PATENTS

| Number | Name | Date |
|---|---|---|
| 419,068 | Randall | Jan. 7, 1890 |
| 997,353 | Yaxley | July 11, 1911 |
| 1,309,437 | Keefer | July 8, 1919 |
| 1,357,461 | Larrabee | Nov. 2, 1920 |
| 1,690,827 | Mathiessen et al. | Nov. 6, 1928 |
| 1,710,088 | Duncan et al. | Apr. 23, 1929 |
| 1,791,899 | Kropff | Feb. 10, 1931 |
| 1,798,583 | Bishop et al. | Mar. 31, 1931 |
| 1,898,048 | Goldberg | Feb. 21, 1933 |
| 1,964,409 | Whittaker | June 26, 1934 |
| 1,965,969 | Sturtevant | July 10, 1934 |
| 1,971,568 | Kranz | Aug. 28, 1934 |
| 2,019,301 | Friden | Oct. 29, 1935 |
| 2,117,653 | Clifton et al. | May 17, 1938 |
| 2,178,768 | Von Pein | Nov. 7, 1939 |
| 2,203,354 | Harrington et al. | June 4, 1940 |
| 2,256,746 | Mayer | Sept. 23, 1941 |
| 2,318,372 | Caldwell | May 4, 1943 |
| 2,319,411 | Leathers | May 18, 1943 |
| 2,340,634 | Wiley | Feb. 1, 1944 |
| 2,425,318 | Hayes | Aug. 12, 1947 |